US009840123B2

(12) United States Patent
Teraoka et al.

(10) Patent No.: US 9,840,123 B2
(45) Date of Patent: *Dec. 12, 2017

(54) SHOCK ABSORBER

(71) Applicant: KAYABA INDUSTRY CO., LTD., Tokyo (JP)

(72) Inventors: Takashi Teraoka, Gifu (JP); Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 160 days.

This patent is subject to a terminal disclaimer.

(21) Appl. No.: 14/777,759

(22) PCT Filed: Mar. 20, 2014

(86) PCT No.: PCT/JP2014/057711
§ 371 (c)(1),
(2) Date: Sep. 17, 2015

(87) PCT Pub. No.: WO2014/148599
PCT Pub. Date: Sep. 25, 2014

(65) Prior Publication Data
US 2016/0288605 A1    Oct. 6, 2016

(30) Foreign Application Priority Data

Mar. 22, 2013  (JP) .................................. 2013-060600
Mar. 22, 2013  (JP) .................................. 2013-060601
Mar. 22, 2013  (JP) .................................. 2013-060602

(51) Int. Cl.
*B60G 17/08*    (2006.01)
*B60G 15/06*    (2006.01)
(Continued)

(52) U.S. Cl.
CPC ........... *B60G 15/061* (2013.01); *B60G 13/08* (2013.01); *F16F 9/187* (2013.01); *F16F 9/3214* (2013.01);
(Continued)

(58) Field of Classification Search
CPC ...... F16F 9/06; F16F 9/061; F16F 9/18; F16F 9/185; F16F 9/186; F16F 9/34; F16F 9/50;
(Continued)

(56) References Cited

U.S. PATENT DOCUMENTS 4,561,524 A * 12/1985 Mizumukai ............ B60G 17/08
                                                         188/282.4
8,479,894 B2 * 7/2013 Yabe ....................... F16F 9/348
                                                         188/266.6
(Continued)

FOREIGN PATENT DOCUMENTS

CN     102734371 A    10/2012
CN     102889330 A    1/2013
(Continued)

*Primary Examiner* — Thomas J Williams
(74) *Attorney, Agent, or Firm* — Rabin & Berdo, P.C.

(57) ABSTRACT

A shock absorber includes a suction passage permitting flow only from a reservoir toward a compression-side chamber, a rectification passage permitting flow only from the compression-side chamber toward an extension-side chamber, and a variable valve permitting flow only from the extension-side chamber toward the reservoir. A large chamber as a compression-side pressure chamber communicating with the compression-side chamber and an outer periphery chamber as an extension-side pressure chamber communicating with the extension-side chamber are partitioned in the shock absorber by a free piston that moves slidably within a bottom member serving as a housing. A compression-side pressure-receiving area of the free piston is larger than an extension-side pressure-receiving area. Therefore, even in the uniflow (Continued)

shock absorber with the extension-side chamber and the compression-side chamber at equal pressures during the contraction operation, the damping force is reduced under conditions in which high frequency is input since the free piston moves downward.

18 Claims, 18 Drawing Sheets

(51) Int. Cl.
| | |
|---|---|
| *B60G 13/08* | (2006.01) |
| *F16F 9/32* | (2006.01) |
| *F16F 9/34* | (2006.01) |
| *F16F 9/53* | (2006.01) |
| *F16F 13/00* | (2006.01) |
| *F16F 9/512* | (2006.01) |
| *F16F 9/516* | (2006.01) |
| *F16F 9/18* | (2006.01) |

(52) U.S. Cl.
CPC .............. *F16F 9/34* (2013.01); *F16F 9/5126* (2013.01); *F16F 9/5165* (2013.01); *F16F 9/53* (2013.01); *F16F 13/007* (2013.01); *B60G 2202/12* (2013.01); *B60G 2202/24* (2013.01); *B60G 2204/424* (2013.01); *B60G 2204/45* (2013.01); *B60G 2600/182* (2013.01); *B60G 2600/44* (2013.01)

(58) Field of Classification Search
CPC .. F16F 9/512; F16F 9/5126; F16F 9/46; F16F 9/464; B60G 17/04; B60G 17/048; B60G 17/06; B60G 17/08
USPC ...... 188/266.1, 266.2, 313, 314, 315, 266.5, 188/266.6
See application file for complete search history.

(56) References Cited

U.S. PATENT DOCUMENTS

| | | | |
|---|---|---|---|
| 8,590,680 B2* | 11/2013 | Maeda | F16F 9/34 |
| | | | 188/282.8 |
| 9,428,030 B2* | 8/2016 | Teraoka | F16F 9/5126 |
| 2011/0214953 A1* | 9/2011 | Maeda | F16F 9/19 |
| | | | 188/266 |
| 2012/0247889 A1 | 10/2012 | Yabe et al. | |
| 2012/0248670 A1 | 10/2012 | Yamashita et al. | |
| 2013/0020158 A1 | 1/2013 | Park | |
| 2014/0231201 A1* | 8/2014 | Maeda | F16F 9/19 |
| | | | 188/317 |
| 2016/0281815 A1* | 9/2016 | Teraoka | F16F 9/5126 |

FOREIGN PATENT DOCUMENTS

| | | |
|---|---|---|
| EP | 2 103 835 A1 | 9/2009 |
| EP | 2546543 A1 | 1/2013 |
| JP | 2009-222136 A | 10/2009 |
| JP | 2012-197905 A | 10/2012 |
| JP | 2013-053683 A | 3/2013 |
| KR | 2012-0112040 A | 10/2012 |

\* cited by examiner

SHOCK ABSORBER

TECHNICAL FIELD

The present invention relates to a shock absorber.

BACKGROUND ART

A conventional shock absorber includes the following: a cylinder, a piston that is slidably inserted into the cylinder, a piston rod that is inserted into the cylinder and connected to a piston, an extension-side chamber and a compression-side chamber that are partitioned by the piston within the cylinder, an intermediate tube that covers an outer periphery of the cylinder and forms a discharge passage between itself and the cylinder, an outer tube that covers an outer periphery of the intermediate tube and forms a reservoir between itself and the intermediate tube, a suction passage that permits only a flow of working oil from the reservoir toward the compression-side chamber, a rectification passage that is provided to the piston and permits only a flow of working oil from the compression-side chamber toward the extension-side chamber, and a damping force variable valve provided between the discharge passage and the reservoir.

This shock absorber is configured such that working oil flows out from within the cylinder to the reservoir through the discharge passage by the action of the rectification passage and the suction passage regardless of whether the shock absorber is extending or compressing, and a damping force exerted by the shock absorber is adjusted by adjusting a resistance imparted to the flow of working oil by the damping force variable valve (refer to JP2009-222136A).

SUMMARY OF INVENTION

In the above-described shock absorber, since the damping force can be adjusted, the shock absorber can exert a damping force that is optimally suited to the vibration of a vehicle body, thereby improving the riding comfort in the vehicle. Further, since the damping force variable valve is provided outside of the cylinder, the above-described shock absorber is advantageous because the stroke length of the shock absorber is not sacrificed and the mountability in a vehicle is not impaired compared to a shock absorber in which the damping force variable valve is provided to the piston.

In the shock absorber disclosed in JP2009-222136A, a solenoid is used to adjust the damping force with the damping force variable valve. Therein, the resistance imparted to the flow of working oil by the damping force variable valve is adjusted by adjusting a thrust force imparted by the solenoid to a pilot valve body that controls a valve opening pressure of the damping force variable valve.

Further, in order to generate an optimal damping force for suppressing the vibration of the vehicle, an ECU (Electronic Control Unit) calculates the optimal damping force from vehicle body vibration information detected by various sensors, and controls the driving of the solenoid on the basis of the calculation results.

Therefore, the frequency upper limit of the vehicle body vibration that can be damped by the shock absorber by adjusting the damping force is currently restricted to several Hz by the responsiveness of the damping force variable valve and the calculation processing speed of the ECU, and thus it is difficult suppress vibration at a frequency higher than several Hz.

However, the frequency of the vehicle body vibration that affects the riding comfort in the vehicle is higher than the above-mentioned frequency band that can be damped, and a conventional shock absorber cannot suppress vibration at such high frequencies.

An object of the present invention is to provide a shock absorber capable of improving the riding comfort in a vehicle.

According to one aspect of the present invention, a shock absorber includes: a cylinder which is filled with a fluid; a piston that is slidably inserted into the cylinder and partitions the inside of the cylinder into an extension-side chamber and a compression-side chamber; a piston rod that is connected at one end to the piston and projects at the other end toward the outside of the cylinder; a reservoir configured to compensate for a change in capacity in the cylinder accompanying an ingression and retraction of the piston rod into and out of the cylinder; a suction passage configured to permit only a flow of the fluid from the reservoir toward the compression-side chamber; a rectification passage configured to permit only a flow of the fluid from the compression-side chamber toward the extension-side chamber; a damping force adjusting part configured to permit only a flow of the fluid from the extension-side chamber toward the reservoir and be capable of changing a resistance applied to the flow of the fluid; a housing that has a pressure chamber therein; a free piston that is slidably inserted into the pressure chamber and forms an extension-side pressure chamber and a compression-side pressure chamber within the pressure chamber; and a spring element configured to position the free piston in a neutral position within the pressure chamber and exert a biasing force to suppress displacement of the free piston from the neutral position. The extension-side chamber communicates with the extension-side pressure chamber so as to press the free piston in one sliding direction, and the compression-side chamber communicates with the compression-side pressure chamber so as to press the free piston in the other sliding direction, and a pressure-receiving area of the free piston upon which a pressure of the compression-side pressure chamber acts is larger than a pressure-receiving area of the free piston upon which a pressure of the extension-side pressure chamber acts.

DESCRIPTION OF EMBODIMENTS

Figure 1:
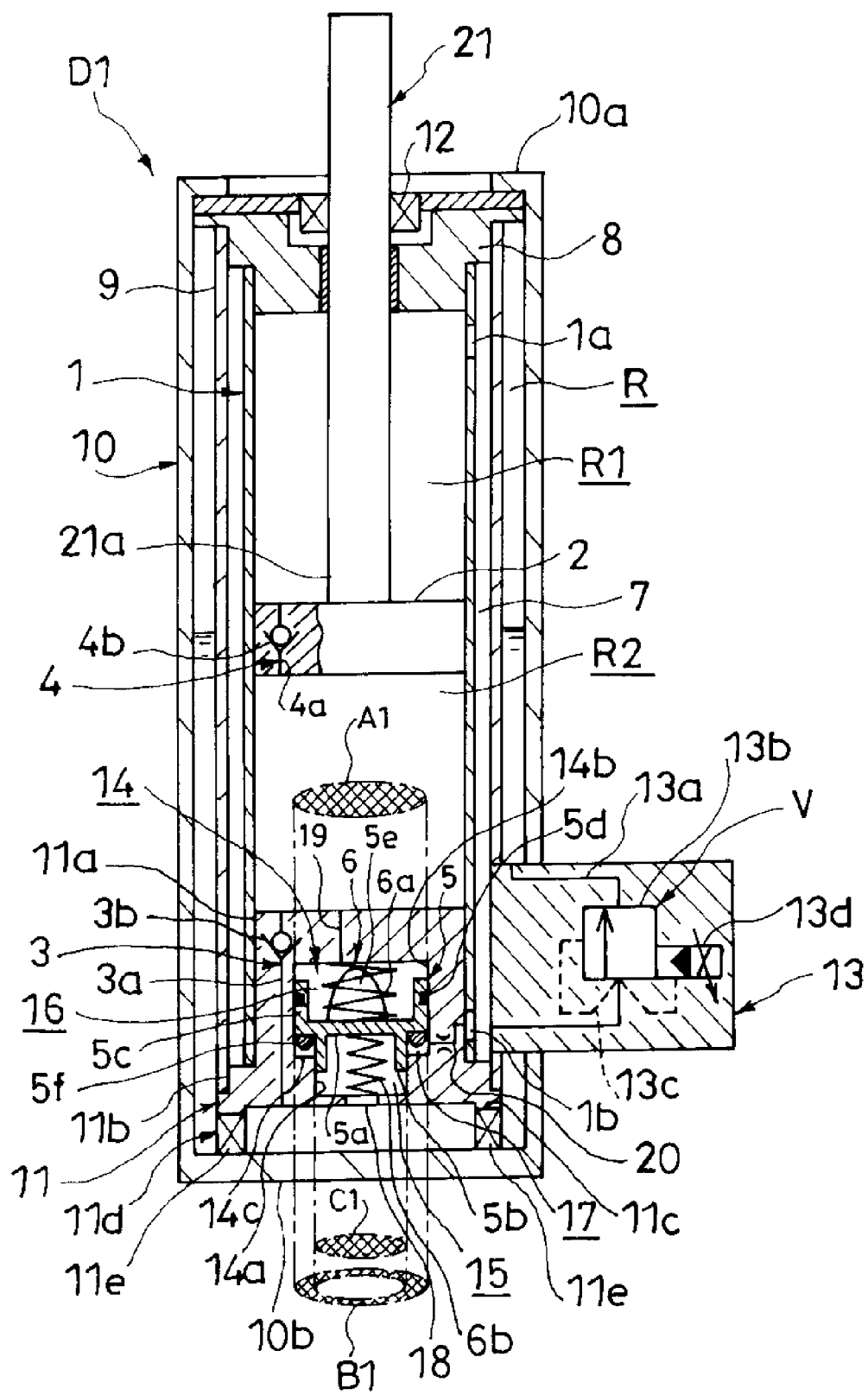
FIG. 1 is a cross-section view of a shock absorber according to a first embodiment of the present invention.

Embodiments of the present invention will now be explained below referring to the drawings.

First Embodiment

First, a shock absorber D1 according to a first embodiment of the present invention will be explained.

As shown in FIG. 1, the shock absorber D1 has a tubular cylinder 1, a piston 2 that is slidably inserted into the cylinder 1 and partitions the inside of the cylinder 1 into two chambers which are an extension-side chamber R1 and a compression-side chamber R2, a reservoir R, a suction passage 3 that permits only a flow of working oil from the reservoir R toward the compression-side chamber R2, a rectification passage 4 that permits only a flow of working oil from the compression-side chamber R2 toward the extension-side chamber R1, a damping force variable valve V serving as a damping force adjusting part that permits only a flow of working oil from the extension-side chamber R1 toward the reservoir R and can change a resistance applied to the flow of working oil, a bottom member 11 serving as a housing that has a pressure chamber 14 therein, a free piston 5 that is slidably inserted into the pressure chamber 14, a spring element 6 that positions the free piston 5 in a neutral position within the pressure chamber 14 and exerts a biasing force to suppress displacement of the free piston 5 from the neutral position, and a compression-side cushion 5e and an extension-side cushion 5f serving as cushion members that prevent the free piston 5 from colliding with the bottom member 11.

The free piston 5 has a plate-shaped base 5a, a small piston part 5b that is slidably inserted into a small cross-section area part 14a of the pressure chamber 14, and a large piston part 5c that is slidably inserted into a large cross-section area part 14b of the pressure chamber 14.

In the pressure chamber 14, a small chamber 15 is partitioned by the small piston part 5b within the small cross-section area part 14a, an outer periphery chamber 17 is partitioned on the outer periphery of the small piston part 5b within the large cross-section area part 14b, and a large chamber 16 is partitioned by the large piston part 5c within the large cross-section area part 14b.

The extension-side chamber R1 communicates with the outer periphery chamber 17 so as to press the free piston 5 in one sliding direction, and the compression-side chamber R2 communicates with the large chamber 16 so as to press the free piston 5 in the other sliding direction. In this way, a pressure originating from the extension-side chamber R1 acts on one side of the free piston 5, and a pressure originating from the compression-side chamber R2 acts on the other side of the free piston 5. In the present embodiment, the outer periphery chamber 17 corresponds to an "extension-side pressure chamber" recited in the claims, and the large chamber 16 corresponds to a "compression-side pressure chamber" recited in the claims.

The shock absorber D1 further includes a piston rod 21 that is connected at one end 21a to the piston 1 and projects at the other end (upper end in FIG. 1) toward the outside of the cylinder 1. The piston rod 21 is slidably supported by an annular rod guide 8 that seals the upper end of the cylinder 1.

The shock absorber D1 includes an intermediate tube 9 that covers the outer periphery of the cylinder 1 and forms a discharge passage 7 between itself and the cylinder 1 to establish communication between the extension-side chamber R1 and the reservoir R, and a bottomed tubular outer tube 10 that covers the outer periphery of the intermediate tube 9 and forms the reservoir R between itself and the intermediate tube 9. The damping force variable valve V is provided between the discharge passage 7 and the reservoir R. The lower ends of the cylinder 1 and the intermediate tube 9 are sealed by the bottom member 11. The pressure chamber 14 and the suction passage 3 are provided on the bottom member 11.

The extension-side chamber R1, the compression-side chamber R2, and the pressure chamber 14 are filled with working oil. A gas is enclosed together with working oil in the reservoir R. In addition to working oil, for example, a fluid such as water or an aqueous solution may be used.

The reservoir R compensates for a change in capacity in the cylinder 1 accompanying the ingression and retraction of the piston rod 21 into and out of the cylinder 1.

Each part of the shock absorber D1 will now be explained in detail below.

A seal is formed between the piston rod 21 and the rod guide 8 by a seal member 12, and the inside of the cylinder 1 is maintained in a liquid-tight state. The outer periphery of the rod guide 8 is formed in a stepped manner, and the rod guide 8 is fitted to the intermediate tube 9 and the outer tube 10. The rod guide 8 blocks the openings at the upper ends in FIG. 1 of the cylinder 1, the intermediate tube 9, and the outer tube 10.

The bottom member 11 is fitted to the lower end in FIG. 1 of the cylinder 1. The bottom member 11 has a small diameter part 11a that is fitted within the cylinder 1, an intermediate diameter part 11b that is fitted within the intermediate tube 9 and has a larger outer diameter than the small diameter part 11a, a large diameter part 11c that is provided on the lower end side in FIG. 1 of the intermediate diameter part 11b and has a larger outer diameter than the intermediate diameter part 11b, a tube part 11d that is provided on a lower end side in FIG. 1 of the large diameter part 11c, and a plurality of notches 11e provided on the tube part 11d.

The bottom member 11, the cylinder 1, the intermediate tube 9, the rod guide 8, and the seal member 12 are accommodated within the outer tube 10. The bottom member 11, the cylinder 1, the intermediate tube 9, the rod guide 8, and the seal member 12 are sandwiched between a clamping part 10a of the outer tube 10 and a bottom part 10b of the outer tube 10 by clamping the upper end in FIG. 1 of the outer tube 10, and thereby these members are fixed to the outer tube 10. Instead of clamping the opening end of the outer tube 10, the bottom member 11, the cylinder 1, the intermediate tube 9, the rod guide 8, and the seal member 12 can also be sandwiched between the bottom part 10b and a cap that is screwed onto the outer tube 10.

The suction passage 3 has a passage 3a that is provided in the bottom member 11 and establishes communication between the reservoir R and the compression-side chamber R2, and a check valve 3b provided in the passage 3a. The passage 3a is formed from the small diameter part 11a of the bottom member 11 across to the large diameter part 11c, and communicates with the reservoir R through the notches 11e. The check valve 3b permits only a flow of working oil from the reservoir R to the compression-side chamber R2, and is set to one-way operation so as to block the flow in the opposite direction.

The rectification passage 4 that permits only a flow of working oil from the compression-side chamber R2 toward the extension-side chamber R1 is provided in the piston 2. Specifically, the rectification passage 4 has a passage 4a that is provided in the piston 2 and establishes communication between the compression-side chamber R2 and the extension-side chamber R1, and a check valve 4b provided in the passage 4a. The check valve 4b permits only a flow of working oil from the compression-side chamber R2 to the extension-side chamber R1, and is set to one-way operation so as to block the flow in the opposite direction.

A through-hole 1a in communication with the extension-side passage R1 is provided near the upper end in FIG. 1 of the cylinder 1. The extension-side chamber R1 communicates with an annular gap formed between the cylinder 1 and the intermediate tube 9 through the through-hole 1a. The annular gap between the cylinder 1 and the intermediate tube 9 forms the discharge passage 7 that establishes communication between the extension-side chamber R1 and the reservoir R.

The damping force variable valve V is provided in a valve block 13 that is bridged across and fixed between the outer tube 10 and the intermediate tube 9. The damping force variable valve V has a flow passage 13a that connects the discharge passage 7 and the reservoir R, a valve body 13b provided in the flow passage 13a, a pilot passage 13c that causes pressure in the extension-side chamber R1 which is on the upstream side of the valve body 13b to act on the valve body 13b and press the valve body 13b in a valve opening direction, and a pressing device 13d that exerts a pressing force to press the valve body 13b in a valve closing direction and can modify the pressing force.

The pressing device 13d can control a pressure that presses the valve body 13b in the valve closing direction by a solenoid, and the pressure is controlled according to an amount of current that is supplied to the solenoid from the outside. Alternatively, the pressing device 13d can press the valve body 13b with only an actuator such as a solenoid, or the pressing force can be controlled according to an amount of current or voltage that is supplied.

If the working oil is a magnetic viscous fluid, instead of the damping force variable valve V, a member such as a coil or the like that can generate a magnetic field in the flow passage 13a which establishes communication between the discharge passage 7 and the reservoir R may be used. In this case, the size of the magnetic field is adjusted by the amount of current that is supplied to the coil from the outside in order to adjust the resistance that is imparted to the flow of the magnetic viscous fluid passing through the flow passage 13a. Further, if the working oil is an electroviscous fluid, instead of the damping force variable valve V, for example, a member that can generate an electric field in the flow passage 13a which establishes communication between the discharge passage 7 and the reservoir R may be used. In this case, the size of the electric field is adjusted by the voltage that is applied from the outside in order to adjust the resistance that is imparted to the flow of the electroviscous fluid passing through the flow passage 13a.

During the compression operation of the shock absorber D1, the piston 2 moves in the downward direction in FIG. 1, the compression-side chamber R2 is compressed, and working oil within the compression-side chamber R2 flows into the extension-side chamber R1 through the rectification passage 4. During this compression operation, since the piston rod 21 enters into the cylinder 1, working oil within the cylinder 1 becomes excessive by an amount equal to the rod penetration volume, and thus the excessive working oil is pushed out from the cylinder 1 and is discharged to the reservoir R through the discharge passage 7. The shock absorber D1 raises the pressure within the cylinder 1 and exerts a compression-side damping force by imparting a resistance with the damping force variable valve V to the working oil that passes through the discharge passage 7 and flows to the reservoir R.

During the extension operation of the shock absorber D1, the piston 2 moves in the upward direction in FIG. 1, the extension-side chamber R1 is compressed, and working oil within the extension-side chamber R1 flows into the reservoir R through the discharge passage 7. During this extension operation, the piston 2 moves upward and the capacity of the compression-side chamber R2 expands, and working oil in an amount corresponding to the amount of expansion of the compression-side chamber R2 is supplied from the reservoir R through the suction passage 3. The shock absorber D1 raises the pressure within the extension-side chamber R1 and exerts an extension-side damping force by imparting a resistance with the damping force variable valve V to the working oil that passes through the discharge passage 7 and flows to the reservoir R.

In this way, the shock absorber D1 is a uniflow shock absorber, in which when the shock absorber D1 extends and compresses, the working oil within the cylinder 1 is necessarily discharged to the reservoir R through the discharge passage 7, and the working oil circulates in one direction in the order of the compression-side chamber R2, the extension-side chamber R1, and the reservoir R. The shock absorber D1 generates both an extension-side and compression-side damping force with only the one damping force variable valve V. If the cross-section area of the piston rod 21 is set to ½ of the cross-section area of the piston 2, the working oil amount that is discharged from the cylinder 1 can be set to be equal on both the extension side and the compression side as long as the amplitude is the same. Thus, if the resistance imparted to the flow of working oil by the damping force variable valve is set to be equal on both the extension side and the compression side, then the damping force on both the extension side and the compression side can be equalized.

The pressure chamber 14 is formed by a hollow part provided on the bottom member 11, and the area, which is divided by an inner wall cross-section that cuts perpendicularly relative to the up-down direction in FIG. 1, changes in the middle of the pressure chamber 14. The pressure chamber 14 has the small cross-section area part 14a in which the area divided by the inner wall cross-section is small on the lower side in FIG. 1, the large cross-section area part 14b in which the area divided by the inner wall cross-section is large on the upper side in FIG. 1, and a stepped part 14c provided in the middle of the small cross-section area part 14a and the large cross-section area part 14b. The small cross-section area part 14a and the large cross-section area part 14b are formed along the sliding direction of the free piston 5.

The free piston 5 is formed in a shape with a step. The small piston part 5b of the free piston 5 is formed in a tube shape and is provided to stand up from the lower end in FIG. 1 of the base 5a, and is slidably inserted into the small cross-section area part 14a. The large piston part 5c of the free piston 5 is formed in a tube shape and is provided to stand up from the outer periphery on the upper end in FIG. 1 of the base 5a, and is slidably inserted into the large cross-section area part 14b. The free piston 5 moves through the inside of the pressure chamber 14 in the axial direction of the shock absorber D1.

The small chamber 15 of the pressure chamber 14 is partitioned by the small piston part 5b, the large chamber 16 is partitioned by the large piston part 5c, and the outer periphery chamber 17 is partitioned by the outer periphery of the small piston part 5b between the base 5a and the stepped part 14c within the large cross-section area part 14b.

A seal ring 5d that slidingly contacts the inner periphery of the large cross-section area part 14b is mounted on the outer periphery of the large piston part 5c of the free piston 5, and thereby communication between the large chamber 16 and the outer periphery chamber 17 through the outer periphery of the free piston 5 is prevented. A seal ring that prevents communication between the outer periphery chamber 17 and the small chamber 15 may also be provided on the outer periphery of the small piston part 5b.

The compression-side cushion 5e is provided on a surface facing the large chamber 16 of the base 5a of the free piston 5, and the extension-side cushion 5f is provided on a surface facing the outer periphery chamber 17 of the base 5a. The compression-side cushion 5e and the extension-side cushion 5f are fixed to the free piston 5 by welding, fusing, adhering, and the like.

The small chamber 15 communicates with the reservoir R through a passage 18 formed in the bottom member 11 and the notches 11e, and a pressure originating from the reservoir R acts on the small chamber 15. The large chamber 16 communicates with the compression-side chamber R2 through a compression-side passage 19 formed in the small diameter part 11a of the bottom member 11, and a pressure originating from the compression-side chamber R2 acts on the large chamber 16. In this way, the large chamber 16 functions as a compression-side pressure chamber that communicates with the compression-side chamber R2.

The outer periphery chamber 17 communicates with the discharge passage 7 through an orifice passage 20 serving as an extension-side passage that is formed in the bottom member 11 and a through-hole 1b that is formed near the lower end of the cylinder 1 opposing the orifice passage 20. Since the discharge passage 7 communicates with the extension-side chamber R1, the outer periphery chamber 17 communicates with the extension-side chamber R1 through the discharge passage 7, and a pressure originating from the extension-side chamber R1 acts on the outer periphery chamber 17. In this way, the outer periphery chamber 17 functions as an extension-side pressure chamber that communicates with the extension-side chamber R1.

The outer periphery chamber 17 communicates with the extension-side chamber R1 utilizing the discharge passage 7 that is provided in order to configure the shock absorber D1 into a uniflow structure. Therefore, it is not necessary to provide a separate passage to establish communication between the outer periphery chamber 17 and the extension-side chamber R1, and thus the costs and weight of the shock absorber D1 can be decreased.

The pressure within the large chamber 16 acts on a pressure-receiving area (a compression-side pressure-receiving area A1) composed of the base 5a of the free piston 5 and an end surface facing the large chamber 16 of the large piston part 5c, and presses the free piston 5 in a direction (downward in FIG. 1) to compress the small chamber 15 and the outer periphery chamber 17.

On the other hand, the pressure within the outer periphery chamber 17 acts on a pressure-receiving area (an extension-side pressure-receiving area B1) composed of an end surface facing the outer periphery chamber 17 of the base 5a of the free piston 5, and presses the free piston 5 in a direction (upward in FIG. 1) to compress the large chamber 16.

In this way, a pressure originating from the extension-side chamber R1 acts on the free piston 5 so as to press the free piston 5 in one sliding direction (upward in FIG. 1), and a pressure originating from the compression-side chamber R2 acts on the free piston 5 so as to press the free piston 5 in the other sliding direction (downward in FIG. 1). The compression-side pressure-receiving area A1 of the free piston 5 upon which the pressure originating from the compression-side chamber R2 acts is set to be larger than the extension-side pressure-receiving area B1 of the free piston 5 upon which the pressure originating from the extension-side chamber R1 acts. In the present embodiment, the compression-side pressure-receiving area A1 of the free piston 5 upon which the pressure of the large chamber 16, which functions as a compression-side pressure chamber, acts is set to be larger than the extension-side pressure-receiving area B1 of the free piston 5 upon which the pressure of the outer periphery chamber 17, which functions as an extension-side pressure chamber, acts.

The pressure within the small chamber 15 acts on a pressure-receiving area C1 composed of the base 5a of the free piston 5 and an end surface facing the small chamber 15 of the small piston part 5b, and presses the free piston 5 in a direction (upward in FIG. 1) to compress the large chamber 16. In this way, a pressure originating from the reservoir R acts on the small chamber 15.

The spring element 6 exerts a biasing force that suppresses displacement of the free piston 5 within the pressure chamber 14. The spring element 6 has a compression-side spring 6a that is interposed in a compressed state between a top surface of the large cross-section area part 14b and the base 5a of the free piston 5 within the large chamber 16, and an extension-side spring 6b that is interposed in a compressed state between the bottom surface of the small cross-section area part 14a and the base 5a of the free piston 5 within the small chamber 15. When the free piston 5 displaces from the neutral position, the compression-side spring 6a and the extension-side spring 6b exert biasing forces to return the free piston 5 to the neutral position. In this way, the free piston 5 is sandwiched from both the upper and lower sides by the compression-side spring 6a and the extension-side spring 6b, so as to be positioned in the predetermined neutral position within the pressure chamber 14. The neutral position does not indicate the center in the axial direction of the pressure chamber 14, but rather a position at which the free piston 5 is positioned by the spring element 6.

As the spring element 6, any kind of element may be used as long as it can position the free piston 5 in the neutral position and exert a biasing force, and thus an element other than a coil spring may be used. For example, the free piston 5 can be elastically supported using an elastic body such as a disc spring. Further, a single spring element that is connected to the free piston 5 at one end and connected to the top surface of the large cross-section area part 14b or the bottom surface of the small cross-section area part 14a at the other end may be used.

In the present embodiment, the compression-side spring 6a and the extension-side spring 6b are used as the spring element 6, and the free piston 5 is configured by providing the tubular small piston part 5b and large piston part 5c to both sides of the base 5a. Therefore, the compression-side spring 6a can be accommodated within the large piston part 5c and the extension-side spring 6b can be accommodated within the small piston part 5b. Thereby, extension/contraction space for the compression-side spring 6a and the extension-side spring 6b is secured, and the overall length of the pressure chamber 14 can be shortened while sufficiently securing the stroke length of the free piston 5. If there are no restrictions on the overall length and the stroke length of the shock absorber D1 and the overall length of the pressure chamber 14 can be sufficiently secured, the small piston part 5b and the large piston part 5c may be configured in solid cylinder shapes.

The shock absorber D1 is constituted as described above. The pressure chamber 14 is partitioned by the free piston 5 into the outer periphery chamber 17 serving as an extension-side pressure chamber and the large chamber 16 serving as a compression-side pressure chamber. When the free piston 5 moves, the capacities of the large chamber 16 and the outer periphery chamber 17 change.

When the shock absorber D1 extends, the piston 2 moves upward in FIG. 1. Thus, working oil from the extension-side chamber R1 that is compressed is discharged to the reservoir R through the damping force variable valve V, and working oil is supplied from the reservoir R to the compression-side chamber R2 that is expanded through the suction passage 3. Therefore, the pressure of the extension-side chamber R1 rises, and the pressure of the compression-side chamber R2 becomes approximately equal to that of the reservoir R.

The large chamber 16 communicates with the compression-side chamber R2 through the compression-side passage 19, and thus the pressure of the large chamber 16 originates from the compression-side chamber R2 and becomes approximately equal to that of the reservoir R. The small chamber 15 also communicates with the reservoir R, and thus the pressure of the small chamber 15 also becomes approximately equal to that of the reservoir R. On the other hand, the outer periphery chamber 17 communicates with the extension-side chamber R1, and thus the pressure of the outer periphery chamber 17 originates from the extension-side chamber R1.

Therefore, when the shock absorber D1 extends, a pressure that is approximately equal to the pressure of the reservoir R acts on the compression-side pressure-receiving area A1 and the pressure-receiving area C1 of the free piston 5, and a pressure originating from the extension-side chamber R1 that is higher than the pressure of the reservoir R acts on the extension-side pressure-receiving area B1, and thus the free piston 5 moves toward the upward side in FIG. 1. When the free piston 5 moves, working oil flows into the outer periphery chamber 17 in accordance with the amount of movement of the free piston 5, and working oil is discharged from the large chamber 16 to the compression-side chamber R2. Therefore, the pressure chamber 14 functions as an apparent flow path, and working oil flows from the extension-side chamber R1 to the compression-side chamber R2 while bypassing the damping force variable valve V. The outer periphery chamber 17 and the extension-side chamber R1 are in communication through the orifice passage 20, and thus sudden displacement of the free piston 5 is suppressed.

When the free piston 5 moves upwards and displaces to the vicinity of the stroke end, the compression-side cushion 5e abuts the top surface of the large cross-section area part 14b and is compressed, and thereby any further displacement of the free piston 5 is suppressed and the displacement speed of the free piston 5 decreases. In this way, the free piston 5 is prevented from forcefully colliding with the bottom member 11, and slapping caused by contact between the free piston 5 and the bottom member 11 can be reduced.

When the shock absorber D1 contracts, the piston 2 moves downwards in FIG. 1, and thus the compression-side chamber R2 that is compressed and the extension-side chamber R1 that is expanded communicate through the rectification passage 4, and working oil from the cylinder 1 is discharged to the reservoir R through the damping force variable valve V. Therefore, the pressures of the extension-side chamber R1 and the compression-side chamber R2 both rise approximately equally.

The large chamber 16 communicates with the compression-side chamber R2 through the compression-side passage 19, and thus the pressure of the large chamber 16 originates from the compression-side chamber R2. The compression-side chamber R2 communicates with the extension-side chamber R1, and thus the pressure of the large chamber 16 becomes approximately equal to that of the extension-side chamber R1. On the other hand, the outer periphery chamber 17 also communicates with the extension-side chamber R1 through the orifice passage 20, and thus the pressure of the outer periphery chamber 17 originates from the extension-side chamber R1.

Therefore, when the shock absorber D1 contracts, a pressure that is approximately equal to the pressure of the extension-side chamber R1 acts on the compression-side pressure-receiving area A1 and the extension-side pressure-receiving area B1 of the free piston 5, and a pressure of the reservoir R acts on the pressure-receiving area C1, and thus the free piston 5 moves toward the downward side in FIG. 1. When the free piston 5 moves, although working oil is discharged from the outer periphery chamber 17 to the discharge passage 7, working oil flows from the compression-side chamber R2 into the large chamber 16 and working oil is discharged from the small chamber 15 to the reservoir R. Thus, working oil moves from the cylinder 1 to the reservoir R in an amount equal to the amount of capacity decrease of the outer periphery chamber 17 subtracted from the amount of capacity expansion of the large chamber 16. In this way, the pressure chamber 14 functions as an apparent flow path, and working oil in the above-mentioned amount flows from cylinder 1 to the reservoir R while bypassing the damping force variable valve V.

When the free piston 5 moves downwards and displaces to the vicinity of the stroke end, the extension-side cushion 5f abuts the stepped part 14c of the bottom member 11 and is compressed, and thereby any further displacement of the free piston 5 is suppressed and the displacement speed of the free piston 5 decreases. In this way, the free piston 5 is prevented from forcefully colliding with the bottom member 11, and slapping caused by contact between the free piston 5 and the bottom member 11 can be reduced.

In this way, a pressure originating from the extension-side chamber R1 acts on the free piston 5 so as to press the free piston 5 in one sliding direction (upward in FIG. 1), and a pressure originating from the compression-side chamber R2 acts on the free piston 5 so as to press the free piston 5 in the other sliding direction (downward in FIG. 1). Further, the compression-side pressure-receiving area A1 of the free piston 5 upon which the pressure originating from the compression-side chamber R2 acts is set to be larger than the extension-side pressure-receiving area B1 of the free piston 5 upon which the pressure originating from the extension-side chamber R1 acts. Therefore, even in the uniflow shock absorber in which the extension-side chamber R1 and the compression-side chamber R2 are structurally at equal pressures during the contraction operation, the free piston 5 can be operated with the pressure chamber 14 functioning as an apparent flow path.

Herein, under conditions in which the piston speed is the same regardless of whether the vibration frequency input into the shock absorber D1 is high or low, when the input frequency is low, the amplitude of the vibration that is input is large and thus the amplitude of the free piston 5 increases. In this case, the stroke amount increases causing the flow amount of working oil that is discharged from the cylinder 1 to the reservoir R to increase, and the amplitude of the free piston 5 increases causing the biasing force of the spring element 6 to increase. Therefore, since it becomes difficult for the free piston 5 to move any further, movement of working oil between the extension-side chamber R1 and the compression-side chamber R2 through the pressure chamber 14 functioning as an apparent passage decreases, and the flow amount of working oil passing through the damping force variable valve V increases. Thus, the damping force generated by the shock absorber D1 can be maintained at a high level.

In contrast, when the input frequency into the shock absorber D1 is high, the amplitude of the vibration that is input decreases, and thus the amplitude of the piston 2 is also small. In this case, the flow amount of working oil that is discharged from the cylinder 1 to the reservoir R decreases, and the amplitude of the free piston 5 also decreases, and thus the biasing force that the free piston 5 receives from the spring element 6 decreases. Therefore, the proportion of the flow amount passing through the pressure chamber 14 functioning as an apparent flow path relative to the flow amount passing through the damping force variable valve V is greater than that during low frequency vibration regardless of whether the shock absorber D1 is in the course of extension or the course of contraction. Thus, the damping force generated by the shock absorber D1 is reduced.

Figure 2:
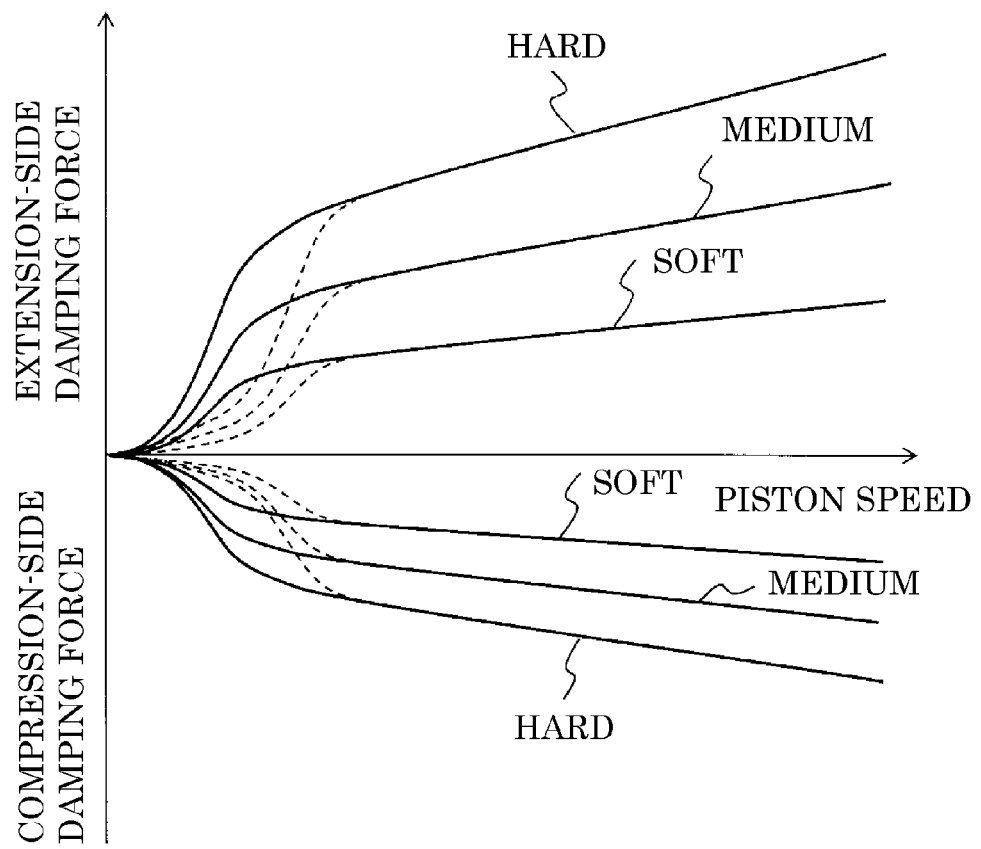
FIG. 2 is a damping characteristics graph of the shock absorber according to the first embodiment of the present invention.

If the extension/contraction speed of the shock absorber increases to a certain extent, the orifice passage 20 presents a large resistance against the flow of working oil and it becomes difficult for the free piston 5 to move, and thus almost no damping force reducing effect is exhibited. Therefore, the damping characteristics of the shock absorber D1 shift as shown in FIG. 2. The solid lines in FIG. 2 represent the damping characteristics when the extension-side and compression-side damping forces of the shock absorber D1 are set to soft, medium, and hard by the damping force variable valve V, and the dashed lines represent the characteristics when high frequency vibrations are input into the shock absorber D1 and the damping force is reduced under conditions in which the damping characteristics are set to soft, medium, and hard.

As shown in FIG. 2, in the shock absorber D1, changes in the damping force can be made to depend on the input vibration frequency, and the posture of the vehicle body (sprung members) can be stabilized by generating a high damping force against input of low frequency vibrations in a resonance frequency band of the sprung members of the vehicle. This prevents passengers from feeling anxiety during vehicle turning.

The shock absorber D1 can adjust the damping force by adjusting the resistance imparted by the damping force variable valve V to the flow of working oil. In other words, in the shock absorber D1, the damping force can be reduced in response to high frequency vibrations even while adjusting the damping force by the damping force variable valve V. Meanwhile, if high frequency vibrations in a resonance frequency band of the unsprung members of the vehicle are input, a low damping force is necessarily generated to insulate the transfer of vibrations from the vehicle wheel side (unsprung members side) to the vehicle body side (sprung members side), and thus the riding comfort in the vehicle can be improved.

Therefore, in the shock absorber D1, not only can vehicle body vibrations be suppressed by adjusting the damping force by control of the damping force variable valve V in response to vibrations in a relatively low frequency band, but a low damping force can also be mechanically exerted in response to high frequency vibrations that cannot be suppressed by control of the damping force variable valve V. Thus, vibrations from the vehicle wheel side can be insulated and vehicle body vibrations can be effectively suppressed.

Further, since the compression-side cushion 5e and the extension-side cushion 5f prevent forceful collisions between the free piston 5 and the bottom member 11, slapping caused by collisions between the free piston 5 and the bottom member 11 can be reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D1.

Therefore, according to the shock absorber D1, the occurrence of slapping between the free piston 5 and the bottom member 11 can be suppressed and sudden changes in the damping force can be prevented, and thereby the riding comfort in the vehicle can be improved.

The frequency band in which the damping force is reduced can be arbitrarily set by the settings of the compression-side pressure-receiving area A1, the extension-side pressure-receiving area B1, and the pressure-receiving area C1 of the free piston 5, the flow path resistance of the passage 18, the compression-side passage 19, and the orifice passage 20, and the spring constant of the spring element 6 (the combined spring constant of the compression-side spring 6a and the extension-side spring 6b). Therefore, instead of the orifice passage 20, or in addition to the orifice passage 20, one or both of the passage 18 and the compression-side passage 19 may be configured as an orifice passage. If it is not necessary to provide an orifice passage, an orifice does not need to be provided to any of the passages 18, 19, and 20. Further, instead of an orifice, a choke throttle can be provided to the passages 18, 19, and 20.

Since the free piston 5 is positioned in the neutral position and returned to the neutral position by the biasing force of the spring element 6, a situation in which the free piston 5 stops at the stroke end such that the damping force reducing effect cannot be exerted by the shock absorber D1 during high frequency vibration input is prevented from occurring. The cross-section shape of the outer periphery of the free piston 5 and the cross-section shape of the inner wall of the pressure chamber 14 can also be any shape besides a circular shape.

In the present embodiment, the small chamber 15 is provided to be in communication with the reservoir R. Instead, the small chamber 15 may be configured to communicate with the outside of the shock absorber D1 by opening it to the atmosphere, or the small chamber 15 may be configured to be an air chamber by enclosing a low-pressure gas therein. Even in these cases, when the shock absorber D1 extends, the free piston 5 moves to the upward side in FIG. 1, working oil flows into the outer periphery chamber 17 in accordance with the amount of movement of the free piston 5, working oil is discharged from the large chamber 16 to the compression-side chamber R2, the pressure chamber 14 functions as an apparent flow path, and working oil moves from the extension-side chamber R1 to the compression-side chamber R2 while bypassing the damping force variable valve V. On the other hand, when the shock absorber D1 contracts, the free piston 5 moves to the downward side in FIG. 1, and working oil moves from the cylinder 1 to the reservoir R while bypassing the damping force variable valve V in an amount corresponding to the total amount of capacity expansion of the outer periphery chamber 17 and the large chamber 16, and thus the flow amount of working oil passing through the damping force variable valve V decreases. Therefore, the shock absorber D1 can exert an effect of reducing the damping force against high frequency vibrations similar to the case in which the small chamber 15 is configured to communicate with the reservoir R.

If the small chamber 15 is configured into an air chamber, the extension-side spring 6b can be configured into a gas spring. Further, if the small chamber 15 is opened to the atmosphere or configured into an air chamber, since it is no longer necessary to make the small chamber 15 communicate with the reservoir R, the bottom member 11 that forms the pressure chamber 14 can be fixed to the piston rod 21 or provided within the piston rod 21. However, making the small chamber 15 communicate with the reservoir R is advantageous in that the pressure chamber 14 can be completely accommodated within the shock absorber D1 and contamination of gas from the small chamber 15 into the outer periphery chamber 17 or the large chamber 16 can be prevented.

When the free piston 5 moves downwards in FIG. 1, since the small chamber 15 and the outer periphery chamber 17 are compressed, instead of disposing the extension-side cushion 5f within the outer periphery chamber 17, the extension-side cushion 5f can be disposed within the small piston part 5b by providing it on the lower end surface of the base 5a of the free piston 5, or it can be disposed within the small chamber 15 by providing it on the lower end surface of the small piston part 5b. Further, the compression-side cushion 5e and the extension-side cushion 5f can be provided on the bottom member 11 instead of the free piston 5, so that the compression-side cushion 5e and the extension-side cushion 5f abut the free piston 5 when the free piston 5 displaces to the vicinity of the stroke end.

In addition, the cushion member may be constituted with only the compression-side cushion 5e that suppresses forceful collisions between the free piston 5 and the bottom member 11 when the large chamber 16 is compressed, or the cushion member may be constituted with only the extension-side cushion 5f that suppresses forceful collisions between the free piston 5 and the bottom member 11 when the small chamber 15 is compressed.

Figure 3:
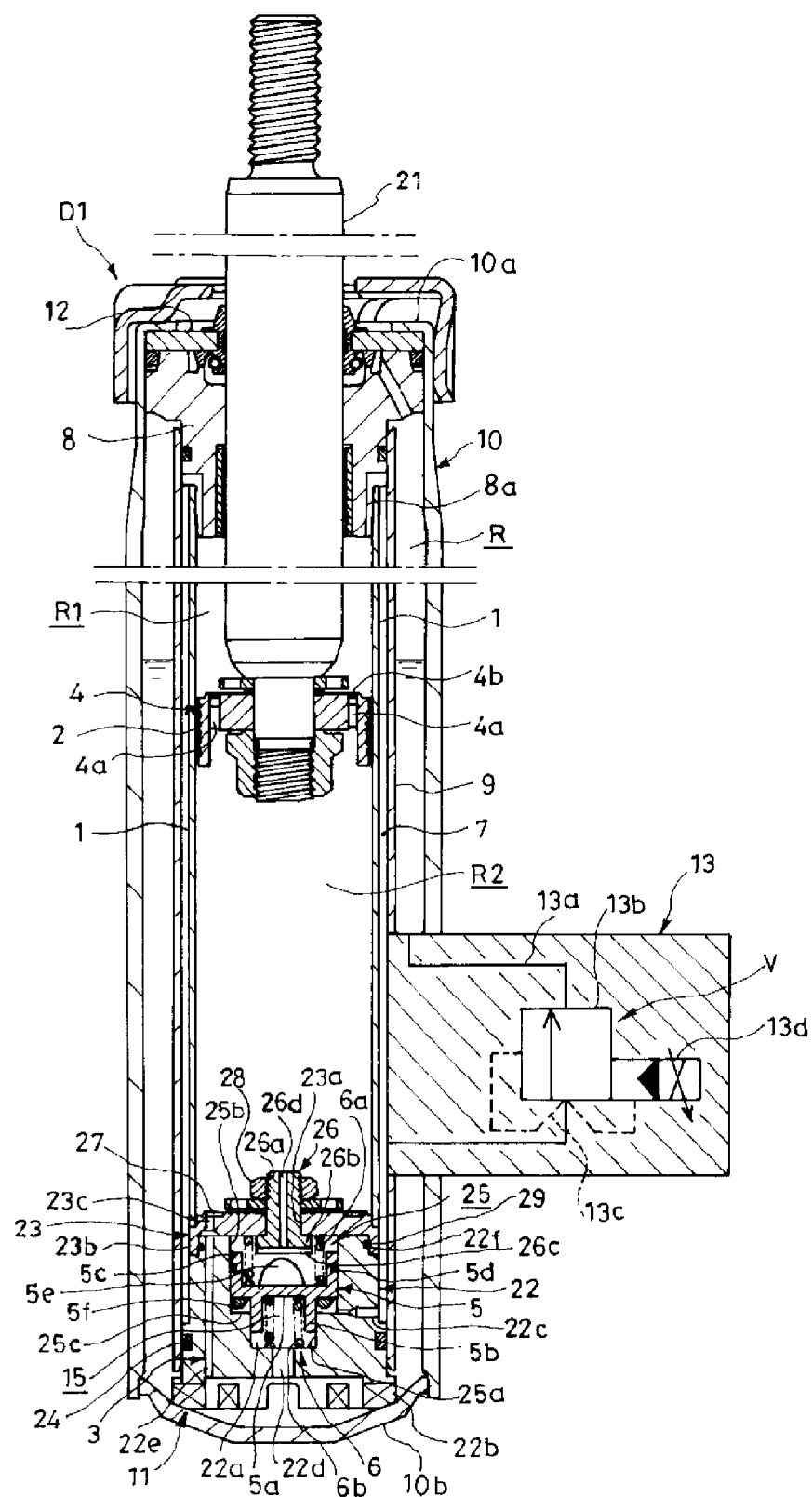
FIG. 3 is a cross-section view of one example of the shock absorber according to the first embodiment of the present invention.

The bottom member 11 was explained schematically above. When concretely applying the bottom member 11 to a shock absorber, for example, as shown in FIG. 3, the bottom member 11 can be constituted by a case member 22 having a hollow part 22a in which the free piston 5 is inserted and a disc-shaped lid member 23 that blocks the hollow part 22a of the case member 22. This will be explained in further detail below.

The case member 22 is an approximately cylindrically shaped member having the hollow part 22a on the inside thereof, and the case member 22 has three stepped parts on its outer periphery. The three stepped parts are formed to stepwisely decrease in diameter toward the upward direction in FIG. 3. The outer periphery of the first step is fitted to the inner peripheral surface of the cylinder 1, the outer periphery of the third step is fitted to the inner peripheral surface of the intermediate tube 9, and the outer diameter of the lower stepped part is larger than the inner diameter of the intermediate tube 9. A seal ring 24 is fitted to the outer peripheral surface of the third step, and the seal ring 24 prevents communication between the discharge passage 7 and the reservoir R through the outer periphery of the case member 22. The lower end of the case member 22 is formed in a tubular shape, and a plurality of notches 22b that establish communication between the inside and outside are formed on the lower end of the case member 22.

The case member 22 has the hollow part 22a which is opened at its upper end in FIG. 3. The hollow part 22a is blocked by the lid member 23 and thus forms a pressure chamber 25. A stepped part 25c is formed on the inner peripheral surface of the hollow part 22a, a small cross-section area part 25a is formed on the distal end side of the hollow part 22a, and a large cross-section area part 25b that is larger in diameter than the small cross-section area part 25a is formed on the base end side of the hollow part 22a.

The case member 22 has a through-hole 22c that penetrates from its inner to outer periphery and leads to the vicinity of the stepped part 25c, a passage 22d that opens at the lower end surface of the case member 22 and communicates with the hollow part 22a, and a passage 22e that is formed at a position deviated from the center of the case member 22 and penetrates in the axial direction.

The lid member 23 has a bolt insertion hole 23a formed along the center axis, a tubular socket 23b formed at the lower end in FIG. 3, and a port 23c that is formed at a position deviated from the center of the lid member 23 and penetrates in the axial direction. The hollow part 22a is blocked to form the pressure chamber 25 by insertion fitting the distal end surface of the case member 22 into the socket 23b of the lid member 23.

A bolt 26 is inserted into the bolt insertion hole 23a. The bolt 26 has a shaft part 26a that has a threaded part on its distal end, and a head part 26b that is larger in diameter than the shaft part 26a. A disc-shaped check valve 27 is mounted onto the outer periphery of the shaft part 26a of the bolt 26. The check valve 27 is fixed to the lid member 23 by a nut 28 that is screwed onto the threaded part formed on the shaft member 26a of the bolt 26, and thereby the port 23c is opened/closed.

A passage 26d that penetrates along the center axis is formed in the bolt 26, and the passage 26d communicates with a groove 26c formed on a distal end top surface of the head part 26b. The pressure chamber 25 and the compression-side chamber R2 communicate through the passage 26d. The free piston 5 is prevented from forcefully colliding with the bottom member 11 by abutting the compression-side cushion 5e to the lower surface in FIG. 3 of the head part 26b of the bolt 26. Therefore, the groove 26c is provided so that the passage 26d is not blocked when the compression-side cushion 5e abuts the head part 26b. In order to avoid blocking the passage 26d, as a method other than providing the groove 26c, for example, the passage 26d can be formed to open at an area where the compression-side cushion 5e does not abut.

The free piston 5, the compression-side spring 6a, and the extension-side spring 6b are accommodated within the hollow part 22a of the case member 22. By insertion fitting the distal end surface of the case member 22 into the socket 23b of the lid member 23, the compression-side spring 6a and the extension-side spring 6b are compressed and the free piston 5 is positioned at the neutral position.

The inside of the pressure chamber 25 is partitioned into the small chamber 15, the large chamber 16, and the outer periphery chamber 17 by the free piston 5. The small chamber 15 communicates with the reservoir R through the passage 22d of the case member 22, the large chamber 16 communicates with the compression-side chamber R2 through the groove 26c and the passage 26d of the bolt 26, and the outer periphery chamber 17 communicates with the discharge passage 7 through the through-hole 22c. The through-hole 22c opens facing the stepped part 25c, and thus communication between the outer periphery chamber 17 and the discharge passage 7 is not obstructed until the free piston 5 completely adheres closely to the stepped part 25c.

If the lid member 23 is integrally engaged with the case member 22, the port 23c communicates with the reservoir R through the passage 22e. The check valve 27 closes by deflecting at its outer peripheral side when the inside of the compression-side chamber R2 is decompressed during the extension operation of the shock absorber D1. Thereby, the reservoir R communicates with the compression-side chamber R2 through the port 23c and the passage 22e. The suction passage 3 is constituted by the check valve 27, the port 23c, and the passage 22e.

When the bottom member 11 is fitted to the lower end of the cylinder 1, the upper end in FIG. 3 of the socket 23b of the lid member 23 abuts the lower end of the cylinder 1. If the bottom member 11 and the cylinder 1 are sandwiched between the clamping part 10a of the outer tube 10 and the bottom part 10b of the outer tube 10, an axial force acts on the bottom member 11 and the case member 22 and the lid member 23 are pressed together so that they are integrated without separating from each other.

The valve block 13 in which the damping force variable valve V is provided is bridged across and fixed between the outer tube 10 and the intermediate tube 9. Therefore, the intermediate tube 9 is configured such that it is permitted to move in the up-down direction relative to the rod guide 8 and the bottom member 11 without being sandwiched from the top and bottom by the rod guide 8 and the bottom member 11. By permitting this movement of the intermediate tube 9 in the up-down direction, the shock absorber D1 can be assembled even if there is a certain level of error in the attachment position of the damping force variable valve V relative to the intermediate tube 9.

The extension-side chamber R1 and the discharge passage 7 communicate through a notch 8a formed in the rod guide 8. Instead, the extension-side chamber R1 and the discharge passage 7 can be configured to communicate through a hole formed in the cylinder 1.

A seal ring 29 is fitted onto the outer periphery at a distal most end, which is the part where the diameter is the smallest, of the case member 22. Thereby, a seal is established between the lid member 23 and the case member 22, and direct communication between the discharge passage 7 and the large chamber 16 is prevented.

By constituting the bottom member 11 as explained above, the bottom member 11 can be assembled without any trouble in the shock absorber D1, and thus the shock absorber D1 can be realized.

Figure 4:
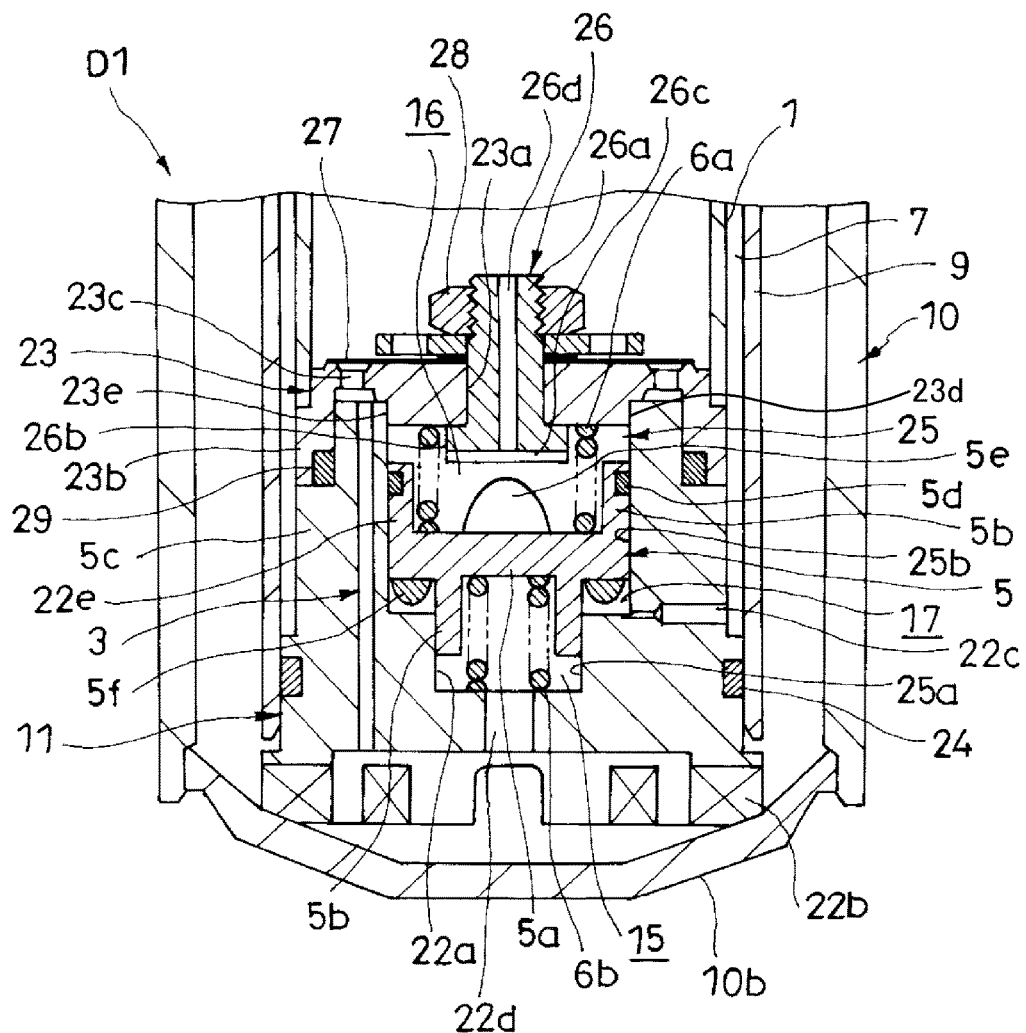
FIG. 4 illustrates an alternative example of the shock absorber according to the first embodiment of the present invention.

FIG. 4 illustrates an alternative example of the first embodiment. In the alternative example shown in FIG. 4, an inner periphery of a tubular part on the distal end of the case member 22 is press fitted into the lid member 23, and an annular groove 23d leading to the port 23c is formed in the lid member 23. Thereby, since the inner periphery of the tubular part of the case member 22 is press fitted without any gaps to the inner peripheral surface of the annular groove 23d, communication between the large chamber 16 and the suction passage 3 is inhibited and a stable damping force reducing effect is obtained. The seal ring 29 that fits closely to the outer periphery of the tubular part of the case member 22 may be fitted to the inner peripheral surface of the socket 23b.

Second Embodiment

Next, a shock absorber D2 according to a second embodiment of the present invention will be explained in FIG. 5.

In the shock absorber D2, the reservoir R communicates with the outer periphery chamber 17, and the extension-side chamber R1 communicates with the small chamber 15 through an orifice passage 30. The shock absorber D2 differs from the shock absorber D1 in this point, but in all other points it is the same as the shock absorber D1. Hereinafter, constitutions that are the same as those in the shock absorber D1 will be assigned the same reference numerals in the drawings and detailed explanations thereof will be omitted.

The small chamber 15 communicates with the extension-side chamber R1 through the orifice passage 30, the through-hole 1b formed in the cylinder 1, and the discharge passage 7. The outer periphery chamber 17 communicates with the reservoir R through a passage 31 formed in the bottom member 11. The large chamber 16 communicates with the compression-side chamber R2 through the compression-side passage 19 as in the shock absorber D1.

Figure 5:
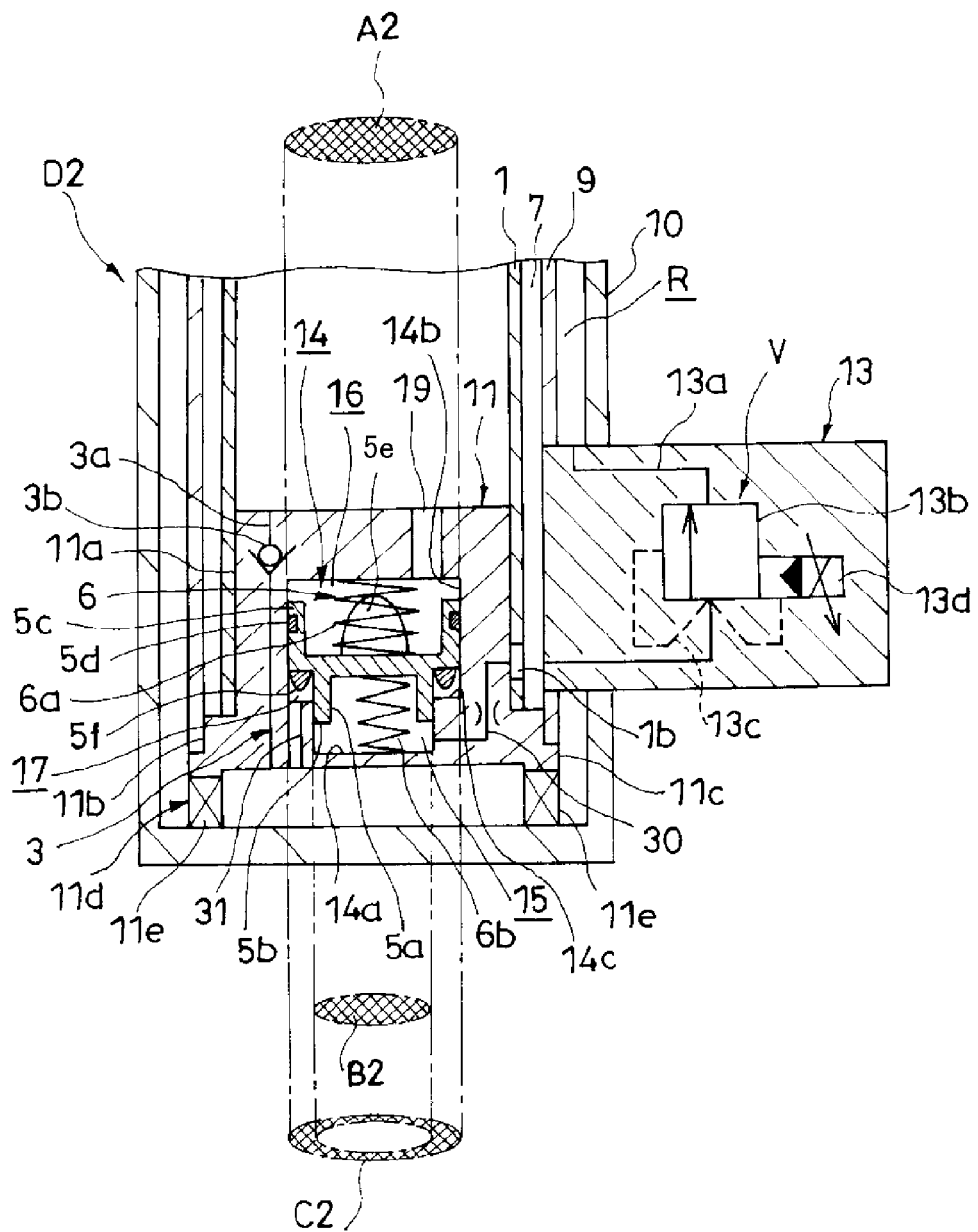
FIG. 5 is a partially enlarged cross-section view of a shock absorber according to a second embodiment of the present invention.

Even with this configuration, a pressure originating from the extension-side chamber R1 acts on the free piston 5 so as to press the free piston 5 in one sliding direction (upward in FIG. 5), and a pressure originating from the compression-side chamber R2 acts on the free piston 5 so as to press the free piston 5 in the other sliding direction (downward in FIG. 5). A compression-side pressure-receiving area A2 of the free piston 5 upon which the pressure originating from the compression-side chamber R2 acts is set to be larger than an extension-side pressure-receiving area B2 of the free piston 5 upon which the pressure originating from the extension-side chamber R1 acts. In the present embodiment, the compression-side pressure-receiving area A2 of the free piston 5 upon which the pressure of the large chamber 16, which functions as a compression-side pressure chamber, acts is set to be larger than the extension-side pressure-receiving area B2 of the free piston 5 upon which the pressure of the small chamber 15, which functions as an extension-side pressure chamber, acts.

A pressure originating from the reservoir R acts on an area other than the extension-side pressure-receiving area B2 upon which the pressure originating from the extension-side chamber R1 acts to press the free piston 5 in one sliding direction. In other words, the pressure originating from the reservoir R acts on an end surface facing the outer periphery chamber 17 of the free piston 5 as a pressure-receiving area C2.

The shock absorber D2 is constituted as described above. The pressure chamber 14 is partitioned by the free piston 5 into the small chamber 15 serving as an extension-side pressure chamber and the large chamber 16 serving as a compression-side pressure chamber. When the free piston 5 moves, the capacity of the small chamber 15 and the large chamber 16 changes.

When the shock absorber D2 extends, the piston 2 moves upward in FIG. 5. Thus, working oil from the extension-side chamber R1 that is compressed is discharged to the reservoir R through the damping force variable valve V, and working oil is supplied from the reservoir R to the compression-side chamber R2 that is expanded through the suction passage 3. Therefore, the pressure of the extension-side chamber R1 rises, and the pressure of the compression-side chamber R2 becomes approximately equal to that of the reservoir R.

The large chamber 16 communicates with the compression-side chamber R2 through the compression-side passage 19, and thus the pressure of the large chamber 16 originates from the compression-side chamber R2 and becomes approximately equal to that of the reservoir R. The outer periphery chamber 17 also communicates with the reservoir R, and thus the pressure of the outer periphery chamber 17 also becomes approximately equal to that of the reservoir R. On the other hand, the small chamber 15 communicates with the extension-side chamber R1, and thus the pressure of the small chamber 15 originates from the extension-side chamber R1.

Therefore, when the shock absorber D2 extends, a pressure that is approximately equal to the pressure of the reservoir R acts on the compression-side pressure-receiving area A2 and the pressure-receiving area C2 of the free piston 5, and a pressure originating from the extension-side chamber R1 that is higher than the pressure of the reservoir R acts on the extension-side pressure-receiving area B2, and thus the free piston 5 moves toward the upward side in FIG. 5. When the free piston 5 moves, working oil flows into the small chamber 15 in accordance with the amount of movement of the free piston 5, and working oil is discharged from the large chamber 16 to the compression-side chamber R2. Therefore, the pressure chamber 14 functions as an apparent flow path, and working oil flows from the extension-side chamber R1 to the compression-side chamber R2 while bypassing the damping force variable valve V. The small chamber 15 and the extension-side chamber R1 are in communication through the orifice passage 30, and thus sudden displacement of the free piston 5 is suppressed.

When the shock absorber D2 contracts, the piston 2 moves downwards in FIG. 5, and thus the compression-side chamber R2 that is compressed and the extension-side chamber R1 that is expanded communicate through the rectification passage 4, and working oil from the cylinder 1 is discharged to the reservoir R through the damping force variable valve V. Therefore, the pressures of the extension-side chamber R1 and the compression-side chamber R2 both rise approximately equally.

The large chamber 16 communicates with the compression-side chamber R2 through the compression-side passage 19, and thus the pressure of the large chamber 16 originates from the compression-side chamber R2. The compression-side chamber R2 communicates with the extension-side chamber R1, and thus the pressure of the large chamber 16 becomes approximately equal to that of the extension-side chamber R1. On the other hand, the small chamber 15 also communicates with the extension-side chamber R1 through the orifice passage 30, and thus the pressure of the small chamber 15 originates from the extension-side chamber R1.

Therefore, when the shock absorber D2 contracts, a pressure that is approximately equal to the pressure of the extension-side chamber R1 acts on the compression-side pressure-receiving area A2 and the extension-side pressure-receiving area B2 of the free piston 5, and a pressure of the reservoir R acts on the pressure-receiving area C2, and thus the free piston 5 moves toward the downward side in FIG. 5. When the free piston 5 moves, although working oil is discharged from the small chamber 15 to the discharge passage 7, working oil flows from the compression-side chamber R2 into the large chamber 16 and working oil is discharged from the outer periphery chamber 17 to the reservoir R. Thus, working oil moves from the cylinder 1 to the reservoir R in an amount equal to the amount of capacity decrease of the small chamber 15 subtracted from the amount of capacity expansion of the large chamber 16. In this way, the pressure chamber 14 functions as an apparent flow path, and working oil in the above-mentioned amount flows from cylinder 1 to the reservoir R while bypassing the damping force variable valve V.

In this way, a pressure originating from the extension-side chamber R1 acts on the free piston 5 so as to press the free piston 5 in one sliding direction (upward in FIG. 5), and a pressure originating from the compression-side chamber R2 acts on the free piston 5 so as to press the free piston 5 in the other sliding direction (downward in FIG. 5). Further, the compression-side pressure-receiving area A2 of the free piston 5 upon which the pressure originating from the compression-side chamber R2 acts is set to be larger than the extension-side pressure-receiving area B2 of the free piston 5 upon which the pressure originating from the extension-side chamber R1 acts. Therefore, even in the uniflow shock absorber in which the extension-side chamber R1 and the compression-side chamber R2 are structurally at equal pressures during the contraction operation, the free piston 5 can be operated with the pressure chamber 14 functioning as an apparent flow path.

Therefore, in the shock absorber D2, changes in the damping force can be made to depend on the input vibration frequency, and the posture of the vehicle body (sprung members) can be stabilized by generating a high damping force against input of low frequency vibrations in a resonance frequency band of the sprung members of the vehicle. This prevents passengers from feeling anxiety during vehicle turning. Meanwhile, if high frequency vibrations in a resonance frequency band of the unsprung members of the vehicle are input, a low damping force is necessarily generated to insulate the transfer of vibrations from the vehicle wheel side (unsprung members side) to the vehicle body side (sprung members side), and thus the riding comfort in the vehicle can be improved.

The shock absorber D2 can adjust the damping force by adjusting the resistance imparted by the damping force variable valve V to the flow of working oil. In other words, in the shock absorber D2, the damping force can be reduced in response to high frequency vibrations even while adjusting the damping force by the damping force variable valve V.

Therefore, in the shock absorber D2, not only can vehicle body vibrations be suppressed by adjusting the damping force by control of the damping force variable valve V in response to vibrations in a relatively low frequency band, but a low damping force can also be mechanically exerted in response to high frequency vibrations that cannot be suppressed by control of the damping force variable valve V. Thus, vibrations from the vehicle wheel side can be insulated and vehicle body vibrations can be effectively suppressed.

Further, since the compression-side cushion 5e and the extension-side cushion 5f prevent forceful collisions between the free piston 5 and the bottom member 11, slapping caused by collisions between the free piston 5 and the bottom member 11 can be reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D2.

Therefore, according to the shock absorber D2, the occurrence of slapping between the free piston 5 and the bottom member 11 can be suppressed and sudden changes in the damping force can be prevented, and thereby the riding comfort in the vehicle can be improved.

The frequency band in which the damping force is reduced can be arbitrarily set by the settings of the compression-side pressure-receiving area A2, the extension-side pressure-receiving area B2, and the pressure-receiving area C2 of the free piston 5, the flow path resistance of the compression-side passage 19, the passage 31, and the orifice passage 30, and the spring constant of the spring element 6 (the combined spring constant of the compression-side spring 6a and the extension-side spring 6b). Therefore, instead of the orifice passage 30, or in addition to the orifice passage 30, one or both of the compression-side passage 19 and the passage 31 may be configured as an orifice passage. If it is not necessary to provide an orifice passage, an orifice does not need to be provided to any of the passages 19, 30, and 31. Further, instead of an orifice, a choke throttle can be provided to the passages 19, 30, and 31.

In the present embodiment, the outer periphery chamber 17 is provided to be in communication with the reservoir R. Instead, the outer periphery chamber 17 may be configured to communicate with the outside of the shock absorber D2 by opening it to the atmosphere, or the outer periphery chamber 17 may be configured to be an air chamber by enclosing a low-pressure gas therein. Even in these cases, when the shock absorber D2 extends, the free piston 5 moves to the upward side in FIG. 5, working oil flows into the small chamber 15 in accordance with the amount of movement of the free piston 5, working oil is discharged from the large chamber 16 to the compression-side chamber R2, the pressure chamber 14 functions as an apparent flow path, and working oil moves from the extension-side chamber R1 to the compression-side chamber R2 while bypassing the damping force variable valve V. On the other hand, when the shock absorber D2 contracts, the free piston 5 moves to the downward side in FIG. 5, and working oil moves from the cylinder 1 to the reservoir R while bypassing the damping force variable valve V in an amount corresponding to the total amount of capacity expansion of the outer periphery chamber 17 and the large chamber 16, and thus the flow amount of working oil passing through the damping force variable valve V decreases. Therefore, the shock absorber D2 can exert an effect of reducing the damping force against high frequency vibrations similar to the case in which the outer periphery chamber 17 is configured to communicate with the reservoir R.

If the outer periphery chamber 17 is configured into an air chamber, the extension-side spring 6b can be configured into a gas spring. Further, if the outer periphery chamber 17 is opened to the atmosphere or configured into an air chamber, since it is no longer necessary to make the outer periphery chamber 17 communicate with the reservoir R, the bottom member 11 that forms the pressure chamber 14 can be fixed to the piston rod 21 or provided within the piston rod 21. However, making the outer periphery chamber 17 communicate with the reservoir R is advantageous in that the pressure chamber 14 can be completely accommodated within the shock absorber D2 and contamination of gas from the outer periphery chamber 17 into the small chamber 15 or the large chamber 16 can be prevented.

Figure 6:
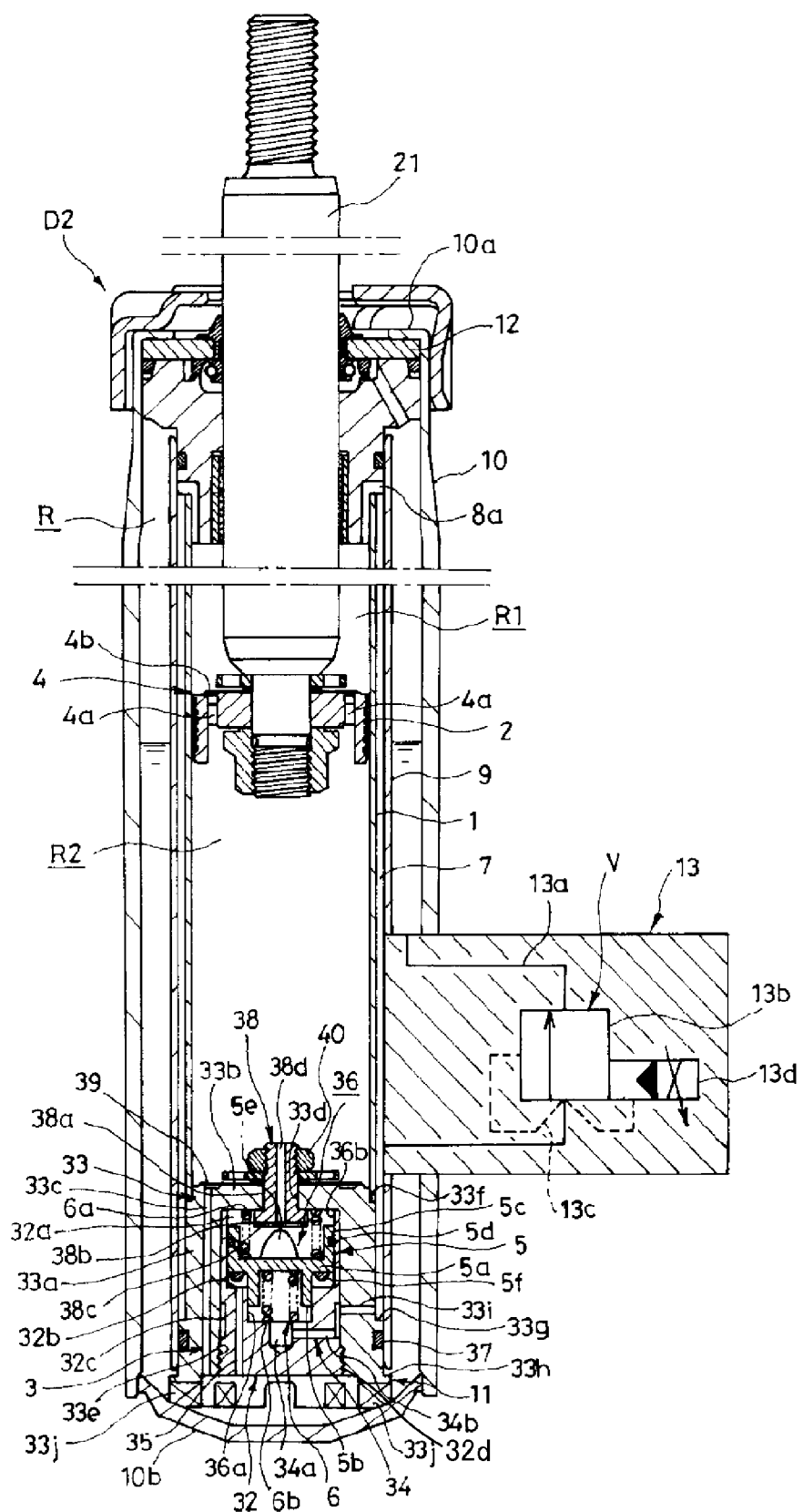
FIG. 6 is a cross-section view of one example of the shock absorber according to the second embodiment of the present invention.

The bottom member 11 was explained schematically above. When concretely applying the bottom member 11 to a shock absorber, for example, as shown in FIG. 6, the bottom member 11 can be constituted by an substantially bottomed cylindrically-shaped case member 32 having a hollow part 32a in which the free piston 5 is inserted and an substantially topped cylindrically-shaped lid member 33 that blocks the hollow part 32a of the case member 32. This will be explained in further detail below.

The case member 32 has the hollow part 32a which has a stepped part 32b on the inner periphery of the case member 32, an annular groove 32c formed on the outer periphery of the case member 32, an orifice passage 34 leading from the annular groove 32c to the hollow part 32a, a through-hole 35 leading from the bottom and passing by the stepped part 32b into the hollow part 32a, and a threaded part 32d formed on the outer periphery at the lower end in FIG. 6 of the case member 32.

The hollow part 32a is blocked by the lid member 33 and thus forms a pressure chamber 36. A small cross-section area part 36a is formed on the distal end side of the hollow part 32a, and a large cross-section area part 36b that is larger in diameter than the small cross-section area part 36a is formed on the base end side of the hollow part 32a.

The orifice passage 34 communicates with the small cross-section area part 36a, and the through-hole 35 communicates with the outer periphery chamber 17. The orifice passage 34 is formed so that it is not blocked even when the free piston 5 has compressed the small chamber 15 to the maximum degree. Specifically, the orifice passage 34 has a vertical hole 34a that is formed extending downwards in FIG. 6 from the bottom surface of the hollow part 32a, and a horizontal hole 34b that functions as an orifice establishing communication between the vertical hole 34a and the annular groove 32c.

The lid member 33 has a port 33c leading from a lower end in FIG. 6 of a tube part 33a out to an upper end in FIG. 6 of a top part 33b, a bolt insertion hole 33d formed along the center axis of the top part 33b, a threaded part 33e formed on the inner periphery of the tube part 33a, three stepped parts 33f, 33g, and 33h formed on the outer periphery of the tube part 33a, and a penetration hole 33i that opens between the stepped part 33f and the stepped part 33g of the tube part 33a and communicates with the annular groove 32c. A notch 33j is formed on the lower end of the tube part 33a, and communication between the inside and the outside of the tube part 33a is established through the notch 33j.

The lower end in FIG. 6 of the cylinder 1 abuts the stepped part 33f of the lid member 33, and a side more towards the distal end than the stepped part 33f (upper side in FIG. 6) of the lid member 33 is fitted within the cylinder 1. The intermediate tube 9 is fitted on the outer periphery of the tube part 33a from the stepped part 33g to the stepped part 33h. Therefore, an annular gap that forms the discharge passage 7 is provided between an area on the outer periphery of the tube part 33a from the stepped part 33f to the stepped part 33g and the intermediate tube 9. A seal ring 37 is mounted on the outer periphery of the tube part 33a that is fitted to the intermediate tube 9, and thus the discharge passage 7 and the reservoir R are prevented from communicating with each other through the gap between the lid member 33 and the intermediate tube 9. When the case member 32 is inserted into the tube part 33a of the lid member 33 and the threaded part 32d is screwed into the threaded part 33e, the case member 32 is fixed to the lid member 33 and the hollow part 32a is blocked so as to form the pressure chamber 36.

A bolt 38 is inserted into the bolt insertion hole 33d. The bolt 38 has a shaft part 38a that has a threaded part on its distal end, and a head part 38b that is larger in diameter than the shaft part 38a. A disc-shaped check valve 39 is mounted onto the outer periphery of the shaft part 38a of the bolt 38. The check valve 39 is fixed to the lid member 33 by the bolt 38 and a nut 40 that is screwed onto the threaded part formed on the shaft member 38a, and thereby the port 33c is opened/closed.

A passage 38d that penetrates along the center axis is formed in the bolt 38, and the passage 38d communicates with a groove 38c formed on a top surface of the head part 38b. The pressure chamber 36 and the compression-side chamber R2 communicate through the passage 38d. The free piston 5 is prevented from forcefully colliding with the bottom member 11 by abutting the compression-side cushion 5e to the lower surface in FIG. 6 of the head part 38b of the bolt 38. Therefore, the groove 38c is provided so that the passage 38d is not blocked when the compression-side cushion 5e abuts the head part 38b. In order to avoid blocking the passage 38d, as a method other than providing the groove 38c, for example the passage 38d can be formed to open at an area where the compression-side cushion 5e does not abut.

The free piston 5, the compression-side spring 6a, and the extension-side spring 6b are accommodated within the hollow part 32a of the case member 32. By fixing the case member 32 to the lid member 33, the compression-side spring 6a and the extension-side spring 6b are compressed and the free piston 5 is positioned at the neutral position.

The inside of the pressure chamber 36 is partitioned into the small chamber 15, the large chamber 16, and the outer periphery chamber 17 by the free piston 5. The small chamber 15 communicates with the extension-side chamber R1 through the orifice passage 34, the penetration hole 33i, and the discharge passage 7, the large chamber 16 communicates with the compression-side chamber R2 through the groove 38c and the passage 38d of the bolt 38, and the outer periphery chamber 17 communicates with the reservoir R through the through-hole 35 and the notch 33j. The through-hole 35 opens at the stepped part 32b, and thus communication between the outer periphery chamber 17 and the reservoir R is not obstructed until the free piston 5 completely adheres closely to the stepped part 32b.

The port 33c of the lid member 33 communicates with the reservoir R through the notch 33j. The check valve 39 closes by deflecting at its outer peripheral side when the inside of the compression-side chamber R2 is decompressed during the extension operation of the shock absorber D2. Thereby, the reservoir R communicates with the compression-side chamber R2 through the port 33c. The suction passage 3 is constituted by the check valve 39 and the port 33c.

When the bottom member 11 is fitted to the lower end of the cylinder 1, the lower end of the cylinder 1 abuts the stepped part 33f of the lid member 33. By sandwiching the bottom member 11 and the cylinder 1 between the clamping part 10a of the outer tube 10 and the bottom part 10b of the outer tube 10, the bottom member 11 and the cylinder 1 are fixed so that they cannot move relative to the outer tube 10.

The valve block 13 in which the damping force variable valve V is provided is bridged across and fixed between the outer tube 10 and the intermediate tube 9. Therefore, the intermediate tube 9 is configured such that it is permitted to move in the up-down direction relative to the rod guide 8 and the bottom member 11 without being sandwiched from the top and bottom by the rod guide 8 and the bottom member 11.

By constituting the bottom member 11 as explained above, the bottom member 11 can be assembled without any trouble in the shock absorber D2, and thus the shock absorber D2 can be realized.

In the shock absorber D2, it is necessary to make the small chamber 15 disposed below the pressure chamber 14 in FIG. 6 communicate with the discharge passage 7 whose lower end is disposed more towards the upper side than the lower end of the small passage 15. Further, in order to ensure that the orifice passage 34 is not blocked by the free piston 5, it is necessary to create a complex passage consisting of the orifice passage 34, the annular groove 32c, and the penetration hole 33i. Therefore, if the outer periphery chamber 17 which is disposed more towards the upper side than the small chamber 15 is configured to communicate with the discharge passage 7 as in the shock absorber D1, the passage shape is simplified and the machining becomes easier.

In the first and second embodiments, the pressure chambers 14, 25, and 36 are formed so that the free piston 5 is movable in the up-down direction of the drawings. Instead, the pressure chambers 14, 25, and 36 can be formed so that the free piston 5 is movable in a lateral direction or a diagonal direction instead of the up-down direction of the drawings, and this can make it so that the free piston 5 does not easily receive the effects of vibrations in the up-down direction that are input into the shock absorber D1, D2. However, by forming the pressure chambers 14, 25, and 36 so that the free piston 5 is movable in the up-down direction of the drawings, the stroke amount of the free piston 5 is easy to secure, and a large free piston 5 can be employed.

Next, alternative examples of the cushion member will be explained below.

Figure 7:
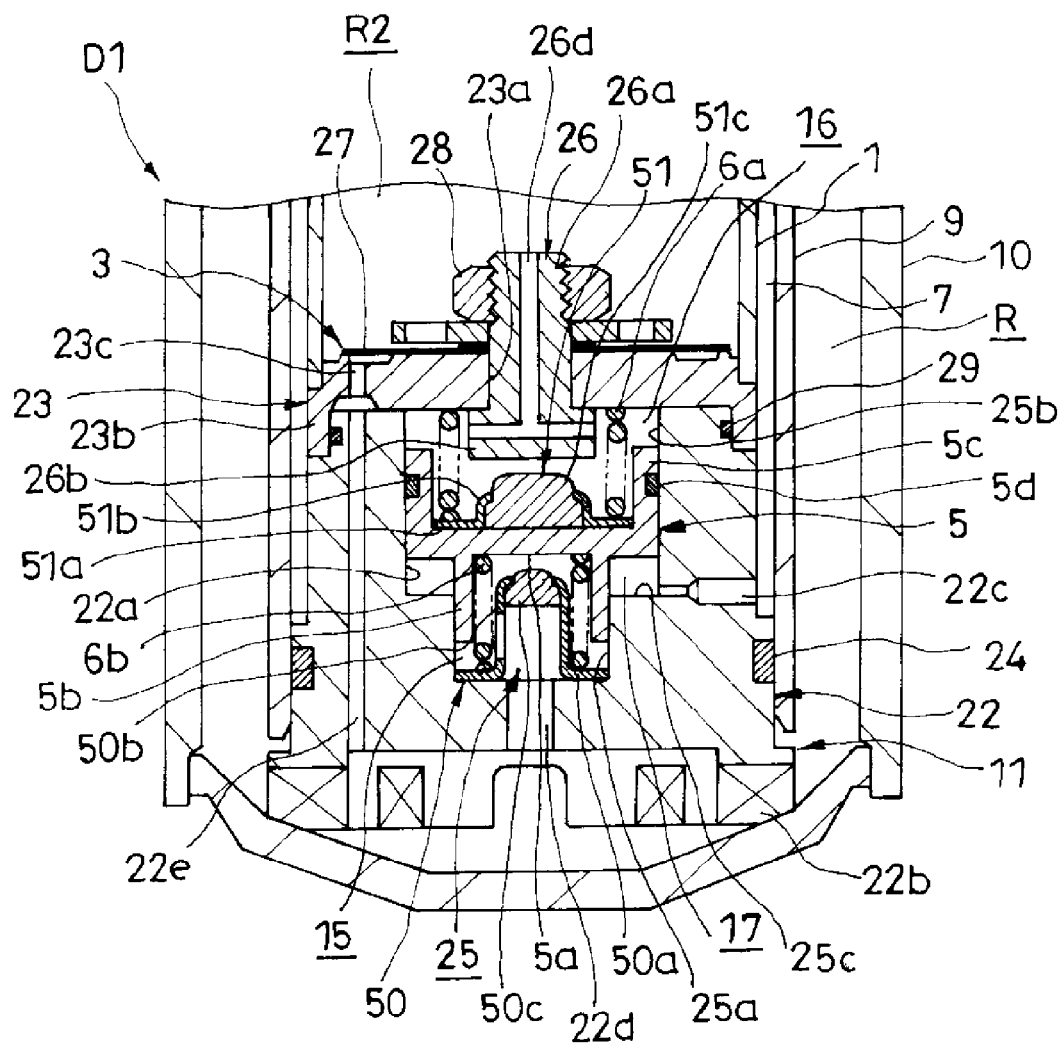
FIG. 7 illustrates an alternative example of a cushion member.

A cushion member of an alternative example shown in FIG. 7 is constituted by an extension-side cushion 50 interposed between the extension-side spring 6b and the bottom member 11, and a compression-side cushion 51 interposed between the compression-side spring 6a and the base 5a of the free piston 5. The extension-side cushion 50 and the compression-side cushion 51 will be explained in detail below.

The extension-side cushion 50 has an annular plate 50a that is laminated on the bottom surface of the pressure chamber 25 in the bottom member 11, a retaining tube 50b that is formed to stand up from the inner periphery of the plate 50a and has a hole that establishes communication between the inside and the outside, and a cushion body 50c that is fixed to the inner periphery of a free piston side end of the retaining tube 50*b* and is made of an elastic body such as rubber. The plate 50*a* is sandwiched by the extension-side spring 6*b* and the bottom member 11 and is fixed to the bottom surface of a hollow part of the bottom member 11. The retaining tube 50*b* has a hole, and thus it does not block the passage 22*d*. The cushion body 50*c* is formed in a convex shape, the distal end of which protrudes from the retaining tube 50*b* toward the free piston side.

When the free piston 5 moves downwards in FIG. 7 and displaces to the vicinity of the stroke end, the cushion body 50*c* abuts the base 5*a* of the free piston 5 and is compressed by the displacement of the free piston 5. The cushion body 50*c* exerts a counterforce in accordance with the degree of compression to gradually decrease the movement speed of the free piston 5. Thereby, the free piston 5 is prevented from forcefully colliding with the bottom member 11, and the occurrence of slapping is inhibited.

Instead of the above-described configuration, the extension-side cushion 50 can be interposed between the extension-side spring 6*b* and the base 5*a* of the free piston 5 and fixed to the free piston 5 side. In other words, the extension-side cushion 50 is fixed to one of the free piston 5 and the bottom member 11 by the extension-side spring 6*b*. In this way, the extension-side cushion 50 is fixed using the extension-side spring 6*b*, and this is advantageous because fixation by welding or adhesion is not necessary.

The compression-side cushion 51 has an annular plate 51*a* that is laminated on the base 5*a* of the free piston 5, a retaining tube 51*b* that is formed to stand up from the inner periphery of the plate 51*a*, and a cushion body 51*c* that is fixed to the inner periphery of the retaining tube 51*b* and is made of an elastic body such as rubber. The plate 51*a* is sandwiched by the compression-side spring 6*a* and the free piston 5 and is fixed to a surface on the large chamber side of the base 5*a* of the free piston 5. The compression-side cushion 51 is inserted into the large piston part 5*c* of the free piston 5, and is accommodated without any looseness in the radial direction. The cushion body 51*c* is formed in a convex shape, the distal end of which protrudes from the retaining tube 51*b* toward the bolt side.

When the free piston 5 moves upwards in FIG. 7 and displaces to the vicinity of the stroke end, the cushion body 51*c* abuts the head part 26*b* of the bolt 26 and is compressed by the displacement of the free piston 5. The cushion body 51*c* exerts a counterforce in accordance with the degree of compression to gradually decrease the movement speed of the free piston 5. Thereby, the free piston 5 is prevented from forcefully colliding with the lid member 23 that constitutes the bottom member 11, and the occurrence of slapping is inhibited.

Instead of the above-described configuration, the compression-side cushion 51 can be interposed between the compression-side spring 6*a* and the lid member 23 and fixed to the bottom member 11. In other words, the compression-side cushion 51 is fixed to one of the free piston 5 and the bottom member 11 by the compression-side spring 6*a*. In this way, the compression-side cushion 51 is fixed using the compression-side spring 6*a*, and this is advantageous because fixation by welding or adhesion is not necessary.

In the alternative example shown in FIG. 7, the passage 26*d* is formed to open at the sides of the head part 26*b*, the groove 26*c* shown in FIGS. 3 and 4 is eliminated, and the lower surface in FIG. 7 is formed as a flat surface. Thereby, deterioration of the compression-side cushion 51 caused by abutting of the compression-side cushion 51 and the head part 26*b* can be suppressed.

In this way, in a shock absorber having the extension-side cushion 50 and the compression-side cushion 51, similar to the shock absorber D1, the occurrence of slapping between the free piston 5 and the bottom member 11 can be suppressed by preventing the free piston 5 from colliding with the bottom member 11, and sudden changes in the damping force can be prevented, thereby improving the riding comfort in the vehicle. Naturally, the extension-side cushion 50 and the compression-side cushion 51 can also be applied to the shock absorber D2.

Figure 8:
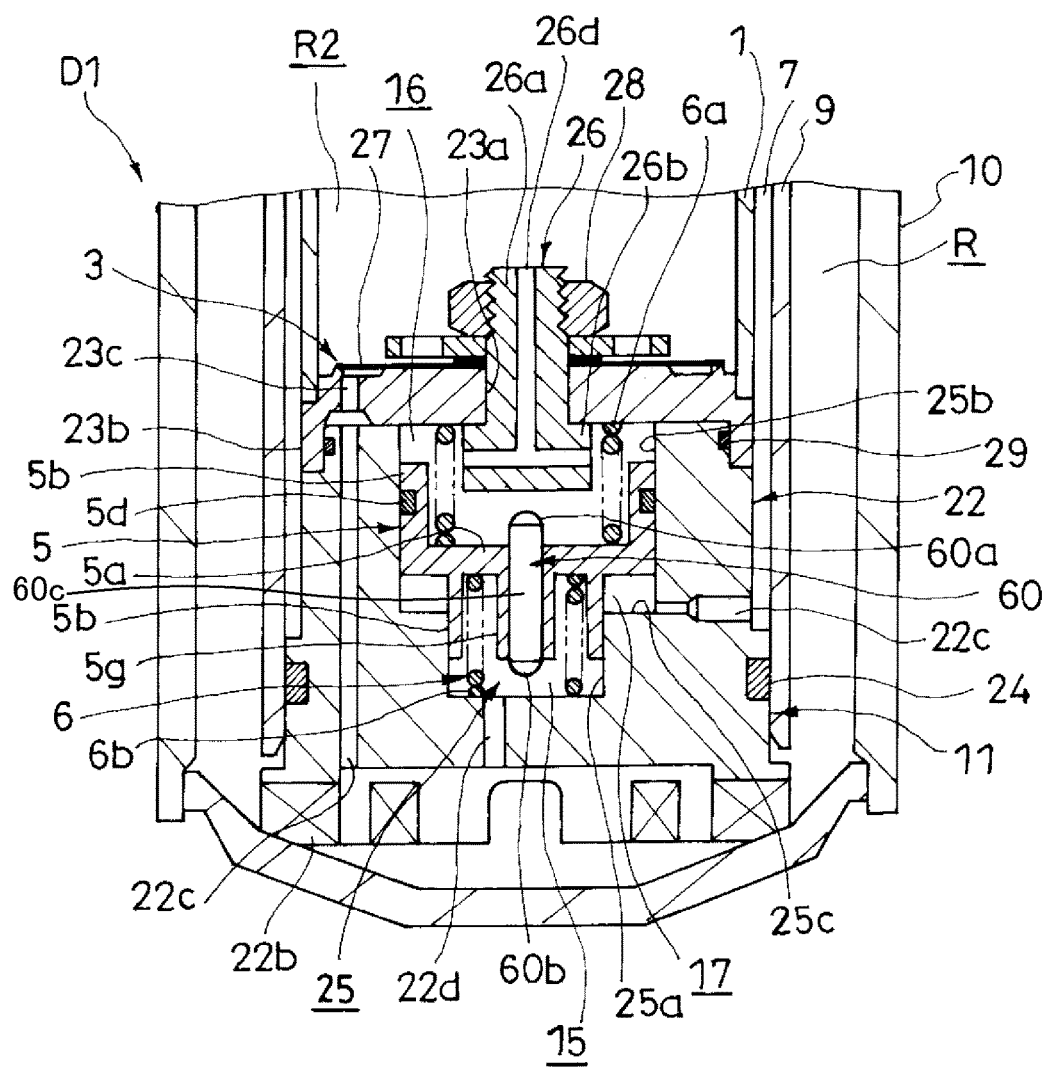
FIG. 8 illustrates an alternative example of a cushion member.

A cushion member 60 of an alternative example shown in FIG. 8 is a rubber member that penetrates through the base 5*a* of the free piston 5. The cushion member 60 will be explained in detail below.

A retaining tube 5*g* that retains the cushion member 60 is formed in the center of the base 5*a* of the free piston 5. The retaining tube 5*g* is formed to protrude from the base 5*a* toward the small chamber 15 side, and the rod-shaped cushion member 60 is inserted into and fixed in the retaining tube 5*g*. An upper end part 60*a* in FIG. 8 and a lower end part 60*b* in FIG. 8 of the cushion member 60 protrude to the outside of the retaining tube 5*g*, and a body part 60*c* is retained by the retaining tube 5*g*. As a method for fixing the cushion member 60 in the retaining tube 5*g*, various methods such as welding, fusing, press-fitting, and the like can be employed.

The upper end part 60*a* of the cushion member 60 has a semispherical shape, protrudes toward the large chamber 16 side, and is provided opposing the lower surface of the head part 26*b* of the bolt 26, and the upper end part 60*a* constitutes a compression-side cushion. The lower end part 60*b* of the cushion member 60 has a semispherical shape, protrudes toward the small chamber 15 side, and is provided opposing the bottom of the pressure chamber 25, and the lower end part 60*b* constitutes an extension-side cushion.

When the free piston 5 moves upwards in FIG. 8 and displaces to the vicinity of the stroke end, the upper end part 60*a* of the cushion member 60 abuts the head part 26*b* of the bolt 26 and is compressed by the displacement of the free piston 5. On the other hand, when the free piston 5 moves downwards in FIG. 8 and displaces to the vicinity of the stroke end, the lower end part 60*b* of the cushion member 60 abuts the bottom of the pressure chamber 25 provided on the bottom member 11 and is compressed by the displacement of the free piston 5.

As explained above, in a shock absorber having the cushion member 60, similar to the shock absorber D1, the occurrence of slapping between the free piston 5 and the bottom member 11 can be suppressed by preventing the free piston 5 from colliding with the bottom member 11, and sudden changes in the damping force can be prevented, thereby improving the riding comfort in the vehicle. Naturally, the cushion member 60 can also be applied to the shock absorber D2.

Since the cushion member 60 is a rubber member, it does not establish communication between the small chamber 15 and the large chamber 15 even if it is provided so as to penetrate through the free piston 5. Therefore, it is not necessary to give any consideration to providing a seal. Further, compared to the cushion members of the shock absorber D1 shown in FIGS. 1 and 4 and the shock absorber D2 shown in FIGS. 5 and 6, the number of parts is reduced and thus the labor required for assembly is also reduced. Therefore, the installation costs of the cushion member 60 are low.

Figure 9:
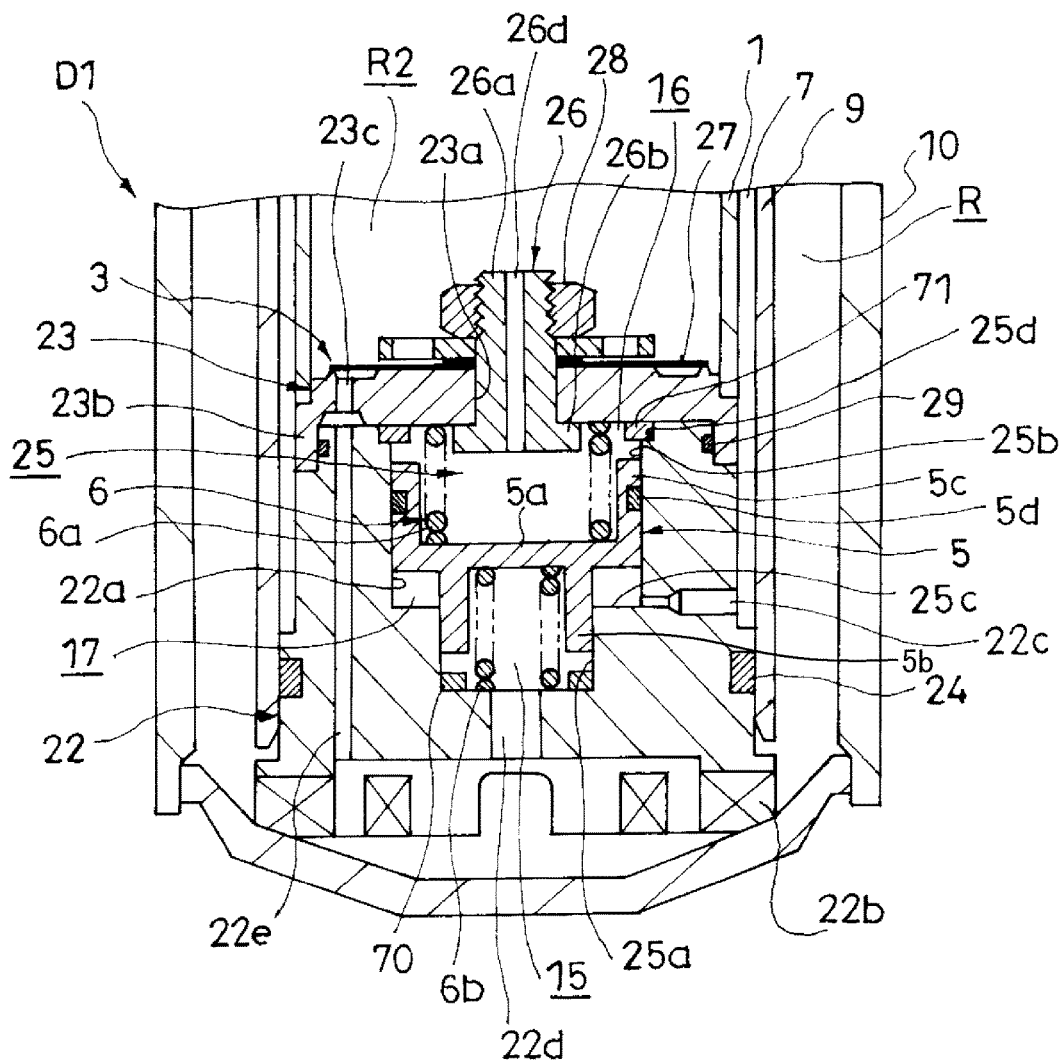
FIG. 9 illustrates an alternative example of a cushion member.

A cushion member of an alternative example shown in FIG. 9 has an annular extension-side cushion 70 serving as a first elastic member that is provided on the bottom member 11, and an annular compression-side cushion 71 serving as a second elastic member that is provided on the bottom member 11. The extension-side cushion 70 and the compression-side cushion 71 will be explained in detail below.

The extension-side cushion 70 is fitted and fixed to the small cross-section area part 25a formed in the case member 22, is laminated onto the bottom surface of the small cross-section area 25a, and opposes an end surface (lower end surface in FIG. 8) facing the small chamber 15 of the small piston part 5b, which is a surface on the small chamber side of the free piston 5. The compression-side cushion 71 is fitted and fixed within an annular recess 25d provided in an opening end of the hollow part of the case member 22, and opposes an end surface (upper end surface in FIG. 8) facing the large chamber 16 of the large piston part 5c, which is a surface on the large chamber side of the free piston 5.

The extension-side cushion 70 and the compression-side cushion 71 can be, for example, rubber rings made of a resin such as rubber, or wave washers. Further, one of the extension-side cushion 70 and the compression-side cushion 71 can be a wave washer while the other is a rubber ring. Further, the cross-section shapes of the extension-side cushion 70 and the compression-side cushion 71 are arbitrary, and various shapes in addition to a square ring or an O ring can be employed.

When the extension-side cushion 70 and the compression-side cushion 71 abut the free piston 5, they suppress any further movement of the free piston 5 toward the stroke end side. In addition, when the extension-side cushion 70 and the compression-side cushion 71 are further compressed by the movement toward the stroke end side of the free piston 5, they exert a repulsive force in accordance with the amount of compression to gradually decrease the speed of the free piston 5. Thereby, the free piston 5 can be prevented from colliding into the case member 22 or the lid member 23.

As explained above, in a shock absorber having the extension-side cushion 70 and the compression-side cushion 71, similar to the shock absorber D1, the occurrence of slapping between the free piston 5 and the bottom member 11 can be suppressed by preventing the free piston 5 from colliding with the bottom member 11, and sudden changes in the damping force can be prevented, thereby improving the riding comfort in the vehicle. Naturally, the extension-side cushion 70 and the compression-side cushion 71 can also be applied to the shock absorber D2.

According to the first and second embodiments explained above, the following effects can be achieved.

According to the shock absorber of the first and second embodiments, not only can vehicle body vibrations be suppressed by adjusting the damping force by the damping force variable valve V in response to vibrations in a relatively low frequency band, but a low damping force can also be mechanically exerted in response to high frequency vibrations that cannot be suppressed by the damping force variable valve V. Thus, vibrations from the vehicle wheel side can be insulated and vehicle body vibrations can be effectively suppressed. Therefore, the riding comfort in the vehicle can be dramatically improved.

Further, since the cushion member prevents forceful collisions between the free piston 5 and the bottom member 11, slapping caused by collisions between the free piston 5 and the bottom member 11 can be reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber.

Therefore, according to the shock absorber of the first and second embodiments, the occurrence of slapping between the free piston 5 and the bottom member 11 can be suppressed and sudden changes in the damping force can be prevented, and thereby the riding comfort in the vehicle can be improved.

Third Embodiment

Next, a shock absorber D3 according to a third embodiment of the present invention will be explained. Hereinafter, constitutions that are the same as those in the first and second embodiments will be assigned the same reference numerals in the drawings and detailed explanations thereof will be omitted, and the following explanations will focus on the points of difference from the first and second embodiments.

The shock absorber D3 according to the third embodiment differs from the first and second embodiments in that it has a hydraulic cushion mechanism L that suppresses collisions between the bottom member 11 and the free piston 5 instead of a cushion member.

The shock absorber D3 will be explained below referring to FIG. 10. Hereinafter, the points of difference from the shock absorber D1 shown in FIG. 1 will be the focus of the explanation.

The hydraulic cushion mechanism L is a variable throttle valve, and is provided in the orifice passage 20 serving as an extension-side passage. When the free piston 5 displaces by a prescribed amount from the neutral position within the pressure chamber 14, the hydraulic cushion mechanism L reduces the flow path area in accordance with the amount of displacement from the neutral position of the free piston 5. The hydraulic cushion mechanism L can continue to reduce the flow path area as the amount of displacement from the neutral position of the free piston 5 increases, or a lower limit of the flow path area can be set so that the hydraulic cushion mechanism L does not reduce the flow path area beyond this lower limit. In addition, the displacement amount of the free piston 5 at which the variable throttle valve begins to reduce the flow path area can be arbitrarily set in a range in which the free piston 5 does not reach the stroke end. For example, this displacement amount can be set to 0 so that the flow path area is immediately reduced upon displacement of the free piston 5 from the neutral position. Also, the displacement amount from the neutral position of the free piston 5 at which the variable throttle valve begins to reduce the flow path area can be set so that it is different on both sides in the movement direction of the free piston 5.

Figure 10:
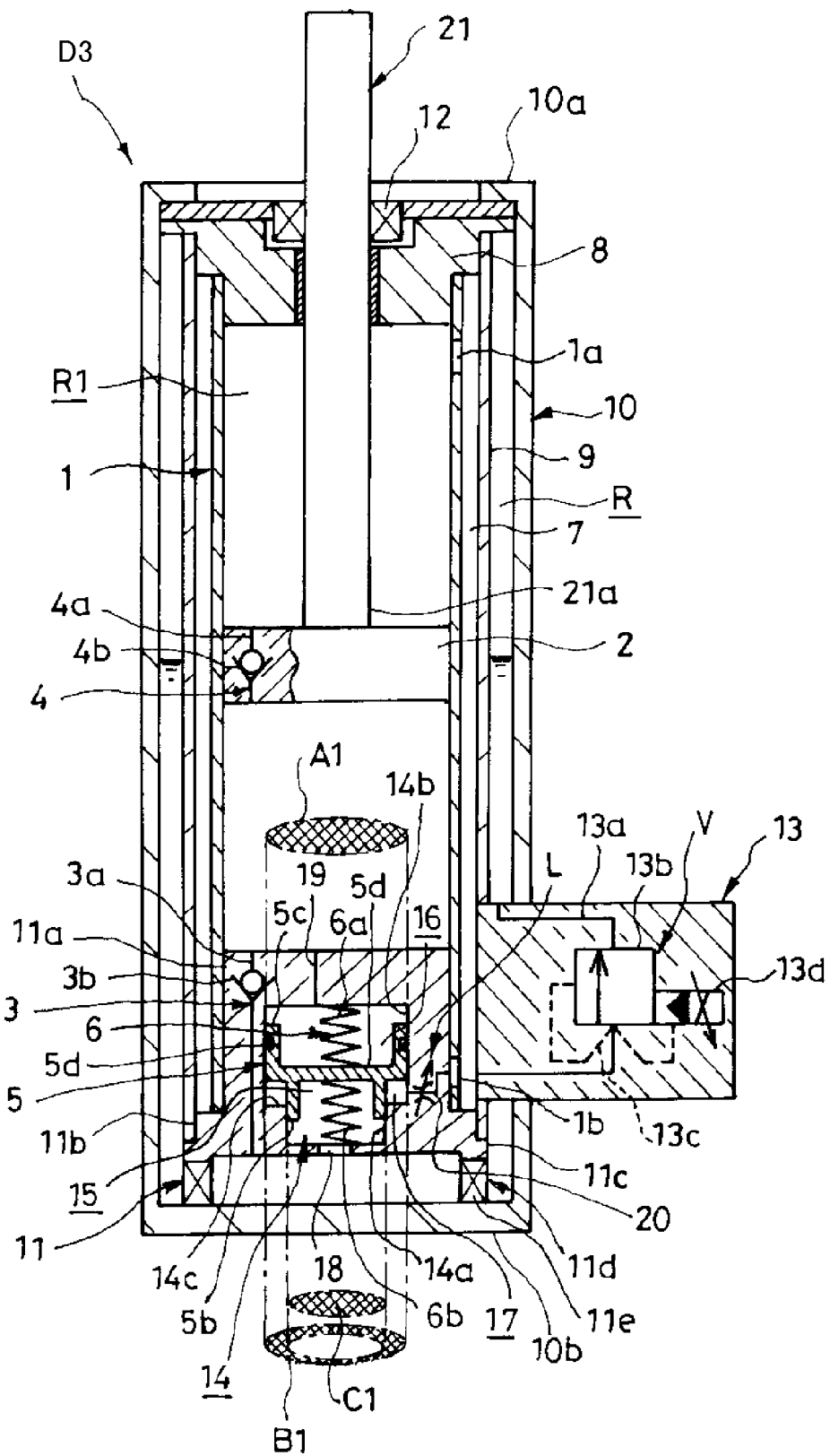
FIG. 10 is a cross-section view of a shock absorber according to a third embodiment of the present invention.

When the shock absorber D3 extends, the free piston 5 moves upwards in FIG. 10 as explained in the first embodiment. Therein, when the free piston 5 displaces by a prescribed amount or more from the neutral position, the variable throttle valve serving as the hydraulic cushion mechanism L decreases the flow path area. Thus, it becomes difficult for working oil to flow into the outer periphery chamber 17 and the movement speed of the free piston 5 decreases. Thereby, forceful collisions between the free piston 5 and the bottom member 11 are suppressed, and slapping that occurs when the free piston 5 and the bottom member 11 contact each other can be reduced.

On the other hand, when the shock absorber D3 contracts, the free piston 5 moves downwards in FIG. 10 as explained in the first embodiment. Therein, when the free piston 5 displaces by a prescribed amount or more from the neutral position, the variable throttle valve serving as the hydraulic cushion mechanism L decreases the flow path area. Thus, it becomes difficult for working oil to be discharged from the outer periphery chamber 17 and the movement speed of the free piston 5 decreases. Thereby, forceful collisions between the free piston 5 and the bottom member 11 are suppressed, and slapping that occurs when the free piston 5 and the bottom member 11 contact each other can be reduced.

According to the shock absorber D3 shown in FIG. 10, since the hydraulic cushion mechanism L suppresses forceful collisions between the free piston 5 and the bottom member 11, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D3.

Therefore, according to the shock absorber D3, the occurrence of slapping between the free piston 5 and the bottom member 11 can be suppressed and sudden changes in the damping force can be prevented, and thereby the riding comfort in the vehicle can be improved.

The frequency band in which the damping force is reduced can be arbitrarily set by the settings of the compression-side pressure-receiving area A1, the extension-side pressure-receiving area B1, and the pressure-receiving area C1 of the free piston 5, the flow path resistance of the passage 18, the compression-side passage 19, and the variable throttle valve serving as the hydraulic cushion mechanism L, and the spring constant of the spring element 6 (the combined spring constant of the compression-side spring 6a and the extension-side spring 6b). Therefore, instead of the hydraulic cushion mechanism L, or in addition to the hydraulic cushion mechanism L, a variable throttle valve may be provided to one or both of the passage 18 and the compression-side passage 19.

Next, the specific structure of the shock absorber D3 shown in FIG. 10 will be explained in detail referring to FIG. 11. Hereinafter, the points of difference from the shock absorber D1 shown in FIG. 3 will be the focus of the explanation.

The orifice passage 20 has a first orifice passage 20a that opens at the outer periphery of the second step from the distal end side of the case member 22 and leads to the vicinity of the stepped part 25c on the inner periphery of the large cross-section area part 25b, and a second orifice passage 20b that opens at the outer periphery of the second step from the distal end side of the case member 22 and leads to the inner periphery of the large cross-section area part 25b.

The free piston 5 has an annular groove 5h formed on the outer periphery of the large piston part 5c, and a hole 5i that is formed in the base 5a more towards the outer periphery side than the small piston part 5b and establishes communication between the outer periphery chamber 17 and the annular groove 5h.

In a state in which the free piston 5 is positioned in the neutral positon by the spring element 6, the annular groove 5h of the large piston part 5c communicates opposing the second orifice passage 20b. When the free piston 5 displaces by a prescribed amount or more in the up-down direction in FIG. 11 from the neutral position, the communication area between the annular groove 5h and the second orifice passage 20b decreases. When the annular groove 5h no longer opposes the second orifice passage 20b, the second orifice passage 20b is blocked by the large piston part 5c.

The small chamber 15 communicates with the reservoir R through the passage 22d of the case member 22, and the large chamber 16 communicates with the compression-side chamber R2 through the passage 26d of the bolt 26. The outer periphery chamber 17 communicates with the extension-side chamber R1 through the first orifice passage 20a and the discharge passage 7, and also communicates with the extension-side chamber R1 through the hole 5i, the annular groove 5h, the second orifice passage 20b, and the discharge passage 7 in the state in which the annular groove 5h opposes the second orifice passage 20b. Therefore, in the shock absorber D3 shown in FIG. 11, the orifice passage 20 serving as an extension-side passage is constituted by the first orifice passage 20a, the hole 5i, the annular groove 5h, the second orifice passage 20b, and the discharge passage 7, and the flow path area of the second orifice passage 20b changes by the displacement of the free piston 5. The variable throttle valve serving as the hydraulic cushion mechanism L is constituted by the free piston 5 and the case member 22.

Figure 11:
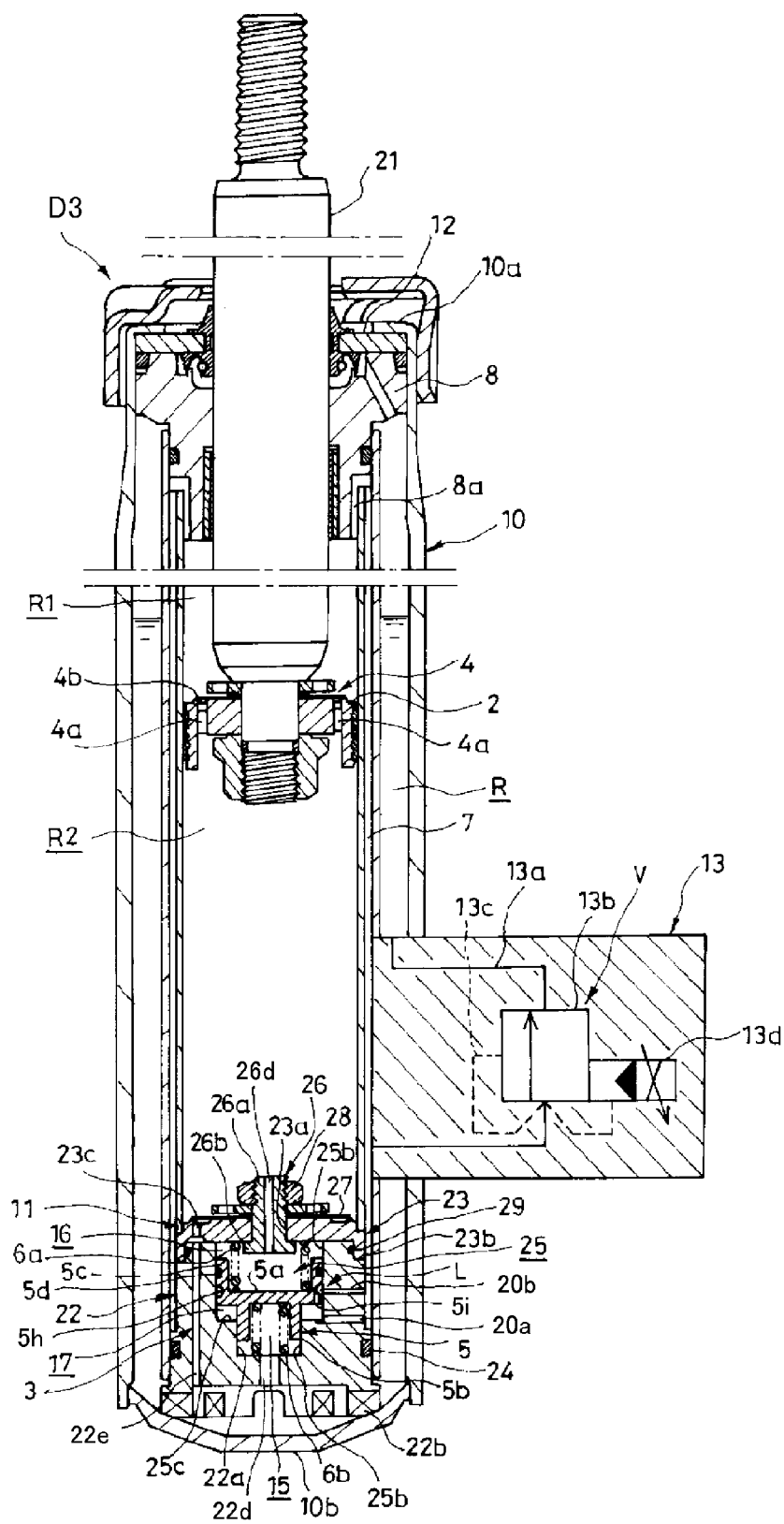
FIG. 11 is a cross-section view of one example of the shock absorber according to the third embodiment of the present invention.

In the shock absorber D3 shown in FIG. 11, since the hydraulic cushion mechanism L suppresses forceful collisions between the free piston 5 and the bottom member 11, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D3.

Further, by constituting the hydraulic cushion mechanism L with the free piston 5 and the case member 22, the variable throttle valve can be provided to the orifice passage 20 with a simple structure and without increasing the number of parts.

Figure 12:
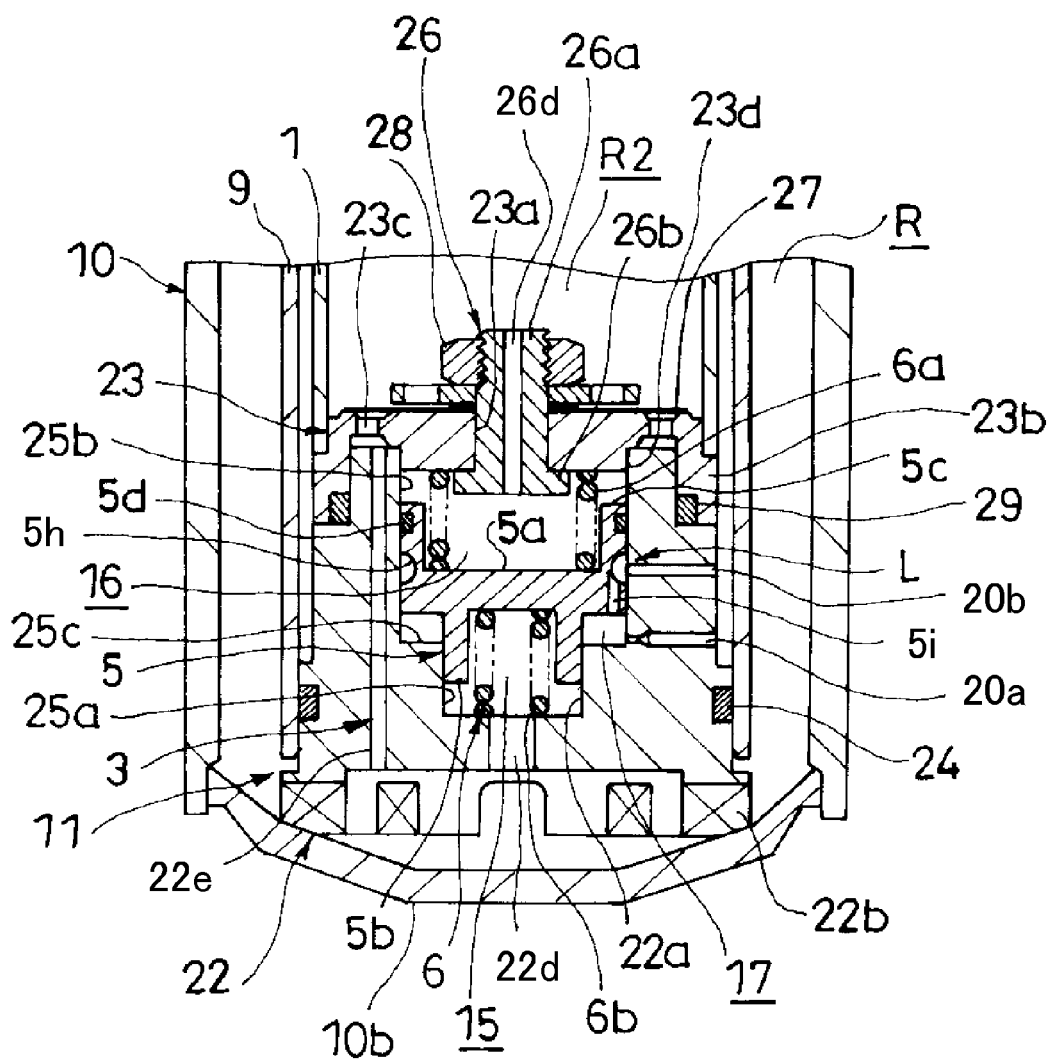
FIG. 12 illustrates an alternative example of the shock absorber according to the third embodiment of the present invention.

FIG. 12 shows an alternative example of the third embodiment. In the alternative example shown in FIG. 12, an inner periphery of a tubular part on the distal end of the case member 22 is press fitted into the lid member 23, and an annular groove 23d leading to the port 23c is formed in the lid member 23. Thereby, since the inner periphery of the tubular part of the case member 22 is press fitted without any gaps to the inner peripheral surface of the annular groove 23d, communication between the large chamber 16 and the suction passage 3 is inhibited and a stable damping force reducing effect is obtained. The seal ring 29 that fits closely to the outer periphery of the tubular part of the case member 22 may be fitted to the inner peripheral surface of the socket 23b.

Fourth Embodiment

Figure 13:
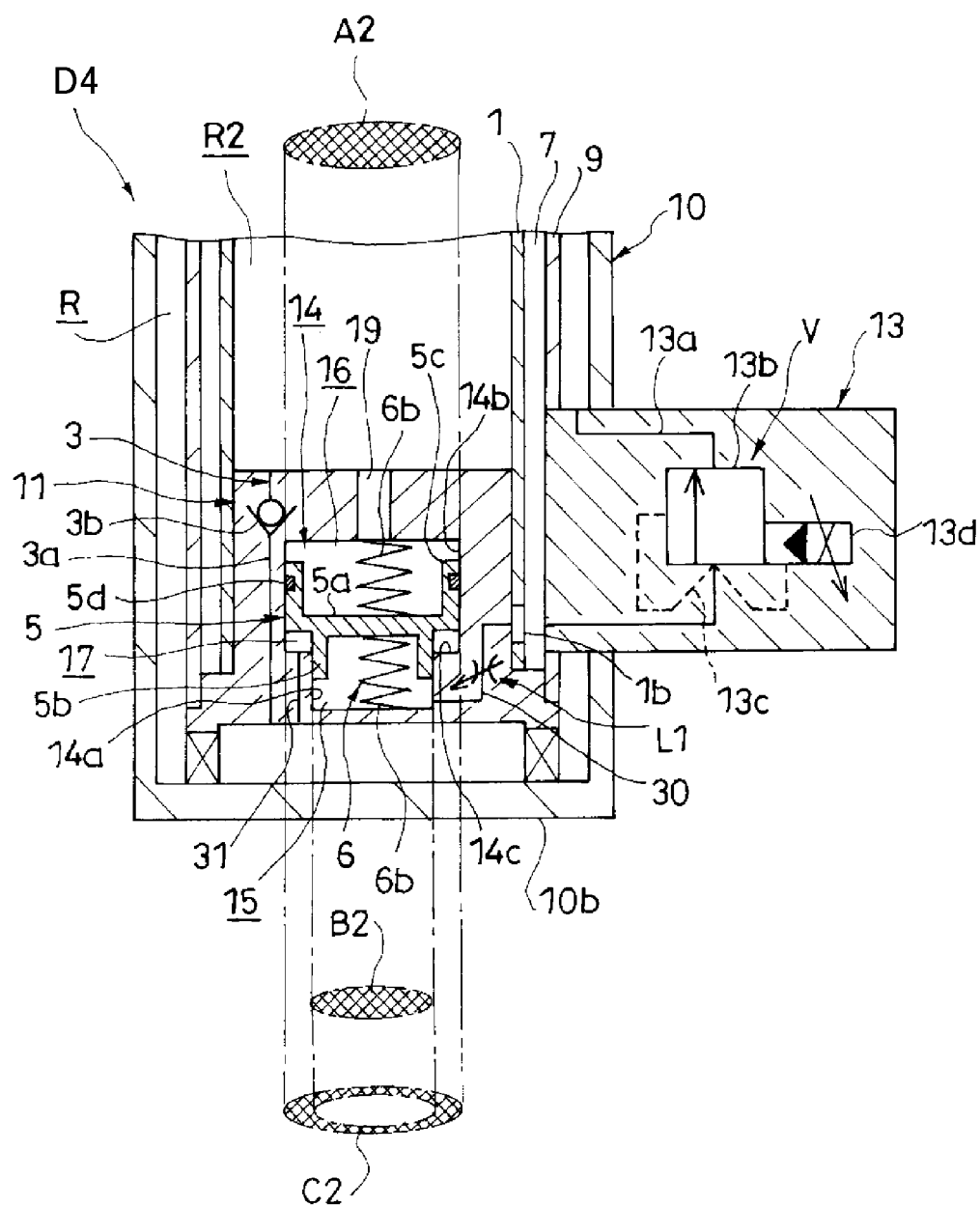
FIG. 13 is a partially enlarged cross-section view of a shock absorber according to a fourth embodiment of the present invention.

FIG. 13 shows a shock absorber D4 according to a fourth embodiment.

In the shock absorber D4, the reservoir R communicates with the outer periphery chamber 17, and the extension-side chamber R1 communicates with the small chamber 15 through the orifice passage 30 in which a variable throttle valve serving as a hydraulic cushion mechanism L1 is provided. The shock absorber D4 differs in this point from the shock absorber D3 shown in FIG. 10, but has the same constitution as the shock absorber D3 shown in FIG. 10 in all other points. Further, the shock absorber D4 differs from the shock absorber D2 shown in FIG. 5 in that the hydraulic cushion mechanism L1 that suppresses collisions between the bottom member 11 and the free piston 5 is provided instead of the cushion member. Hereinafter, constitutions that are the same as those in the shock absorber D3 and the shock absorber D2 will be assigned the same reference numerals in the drawings and detailed explanations thereof will be omitted.

The hydraulic cushion mechanism L1 is a variable throttle valve, and is provided in the orifice passage 30 serving as an extension-side passage. When the free piston 5 displaces by a prescribed amount from the neutral position within the pressure chamber 14, the hydraulic cushion mechanism L1 reduces the flow path area in accordance with the amount of displacement from the neutral position of the free piston 5. The hydraulic cushion mechanism L1 can continue to reduce the flow path area as the amount of displacement from the neutral position of the free piston 5 increases, or a lower limit of the flow path area can be set so that the hydraulic cushion mechanism L1 does not reduce the flow path area beyond this lower limit. In addition, the displacement amount of the free piston 5 at which the variable throttle valve begins to reduce the flow path area can be arbitrarily set in a range in which the free piston 5 does not reach the stroke end. For example, this displacement amount can be set to 0 so that the flow path area is immediately reduced upon displacement of the free piston 5 from the neutral position. Also, the displacement amount from the neutral position of the free piston 5 at which the variable throttle valve begins to reduce the flow path area can be set so that it is different on both sides in the movement direction of the free piston 5.

When the free piston 5 displaces upwards by a prescribed amount or more from the neutral position, the variable throttle valve serving as the hydraulic cushion mechanism L1 decreases the flow path area. Thus, it becomes difficult for working oil to flow into the small chamber 15 and the movement speed of the free piston 5 decreases. Thereby, forceful collisions between the free piston 5 and the bottom member 11 are suppressed, and slapping that occurs when the free piston 5 and the bottom member 11 contact each other can be reduced.

On the other hand, when the free piston 5 displaces downwards by a prescribed amount or more from the neutral position, the variable throttle valve serving as the hydraulic cushion mechanism L1 decreases the flow path area. Thus, it becomes difficult for working oil to be discharged from the small chamber 15 and the movement speed of the free piston 5 decreases. Thereby, forceful collisions between the free piston 5 and the bottom member 11 are suppressed, and slapping that occurs when the free piston 5 and the bottom member 11 contact each other can be reduced.

According to the shock absorber D4 shown in FIG. 13, since the hydraulic cushion mechanism L1 suppresses forceful collisions between the free piston 5 and the bottom member 11, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D4.

Therefore, according to the shock absorber D4, the occurrence of slapping between the free piston 5 and the bottom member 11 can be suppressed and sudden changes in the damping force can be prevented, and thereby the riding comfort in the vehicle can be improved.

The frequency band in which the damping force is reduced can be arbitrarily set by the settings of the compression-side pressure-receiving area A2, the extension-side pressure-receiving area B2, and the pressure-receiving area C2 of the free piston 5, the flow path resistance of the compression-side passage 19, the passage 31, and the variable throttle valve serving as the hydraulic cushion mechanism L1, and the spring constant of the spring element 6 (the combined spring constant of the compression-side spring 6a and the extension-side spring 6b). Therefore, instead of the hydraulic cushion mechanism L1, or in addition to the hydraulic cushion mechanism L1, a variable throttle valve may be provided to one or both of the compression-side passage 19 and the passage 31.

Next, the specific structure of the shock absorber D4 shown in FIG. 14 will be explained in detail referring to FIG. 14. Hereinafter, the points of difference from the shock absorber D2 shown in FIG. 6 will be the focus of the explanation.

The case member 32 has a first orifice passage 42 and a second orifice passage 43 that establish communication between the annular groove 32c formed on the outer periphery and the hollow part 32a.

The first orifice passage 42 and the second orifice passage 43 communicate with the small cross-section area part 36a. The first orifice passage 42 is formed so that it is not blocked even when the free piston 5 has compressed the small chamber 15 to the maximum degree. Specifically, the first orifice passage 42 has a vertical hole 34a that is formed extending downwards in FIG. 14 from the bottom surface of the hollow part 32a, and a horizontal hole 34b that functions as an orifice establishing communication between the vertical hole 34a and the annular groove 32c. The second orifice passage 43 opens at the annular groove 32c and opens at the inner periphery of the small cross-section area part 36a.

The shock absorber D3 shown in FIG. 11 has the annular groove 5h and the hole 5i formed in the free piston 5. Instead of this constitution, the shock absorber D4 has an annular groove 5j formed in an annular shape on the outer periphery of the small piston part 5b of the free piston 5, and a hole 5k that is formed to open at the inner periphery of the small piston part 5b and establishes communication between the small chamber 15 and the annular groove 5j.

The large chamber 16 communicates with the compression-side chamber R2 through the passage 38d formed in the bolt 38. The passage 38d corresponds to the compression-side passage 19 shown in FIG. 13. The outer periphery chamber 17 communicates with the reservoir R through the through-hole 35 and the notch 33j. The through-hole 35 opens at the stepped part 32b of the case member 32, and thus communication between the outer periphery chamber 17 and the reservoir R is not obstructed until the free piston 5 completely adheres closely to the stepped part 32b.

When the free piston 5 is positioned in the neutral positon by the spring element 6, the annular groove 5j formed on the outer periphery of the small piston part 5b communicates opposing the second orifice passage 43. When the free piston 5 displaces by a prescribed amount or more in the up-down direction in FIG. 14 from the neutral position, the communication area between the annular groove 5j and the second orifice passage 43 decreases. When the annular groove 5j no longer opposes the second orifice passage 43, the second orifice passage 43 is blocked by the small piston part 5b.

The small chamber 15 communicates with the extension-side chamber R1 through the first orifice passage 42, the annular groove 32c, the penetration hole 33i, and the discharge passage 7, and also communicates with the extension-side chamber R1 through the hole 5k, the annular groove 5j, the second orifice passage 43, and the discharge passage 7 in the state in which the annular groove 5*j* opposes the second orifice passage 43. Therefore, in the shock absorber D4 shown in FIG. 14, the extension-side passage is constituted by the first orifice passage 42, the annular groove 32*c*, the penetration hole 33*i*, the hole 5*k*, the annular groove 5*j*, the second orifice passage 43, and the discharge passage 7, and the flow path area of the second orifice passage 43 changes by the displacement of the free piston 5. The variable throttle valve serving as the hydraulic cushion mechanism L1 is constituted by the free piston 5 and the case member 32.

Figure 14:
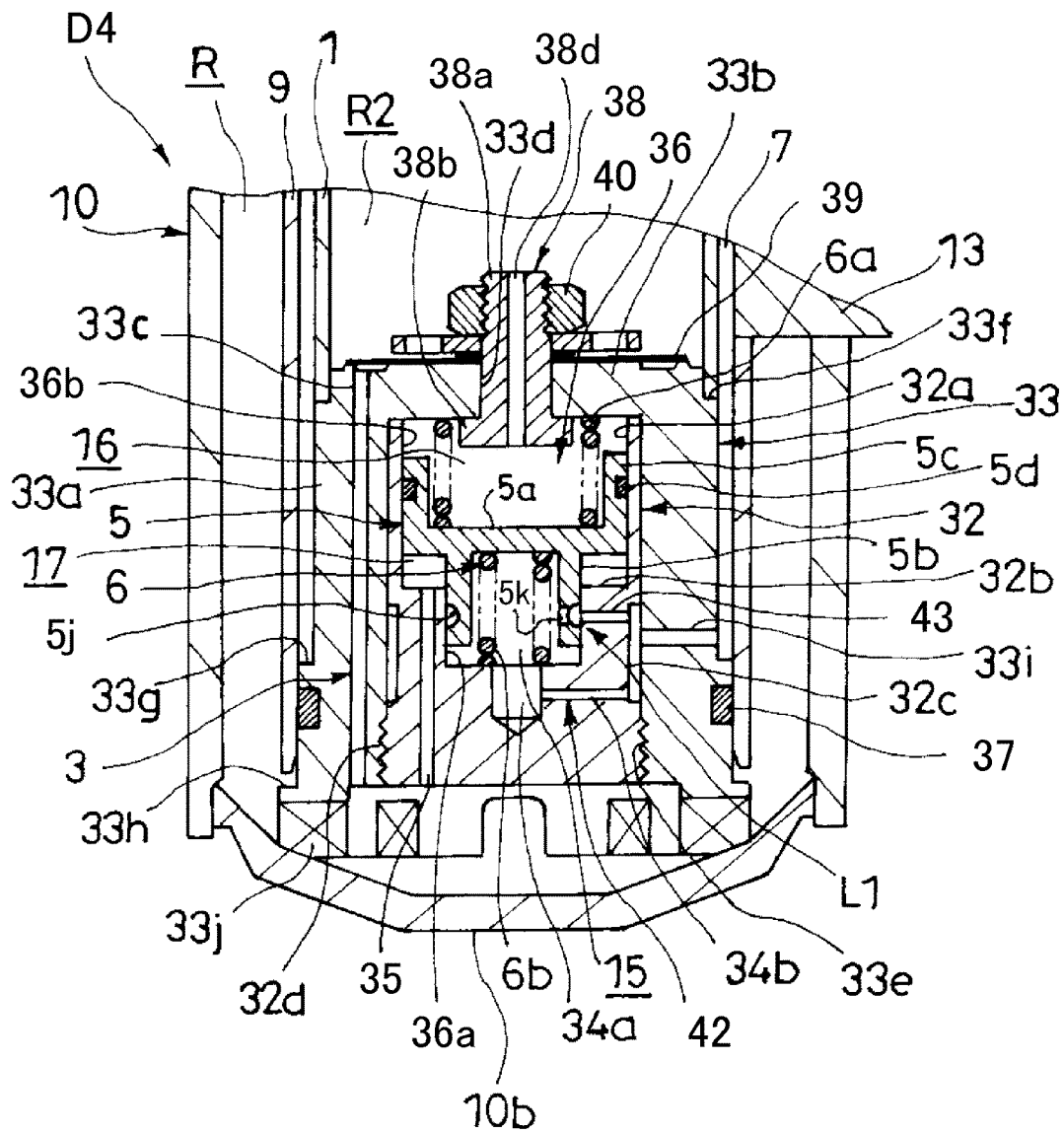
FIG. 14 is a partially enlarged cross-section view of one example of the shock absorber according to the fourth embodiment of the present invention.

In the shock absorber D4 shown in FIG. 14, since the hydraulic cushion mechanism L1 suppresses forceful collisions between the free piston 5 and the bottom member 11, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D4.

Further, by constituting the hydraulic cushion mechanism L1 with the free piston 5 and the case member 32, the variable throttle valve can be provided to the extension-side passage with a simple structure and without increasing the number of parts.

Next, an alternative example of the hydraulic cushion mechanism will be explained.

The hydraulic cushion mechanism may be constituted by a compression-side passage restricting part that restricts the flow path area of the compression-side passage when the free piston 5 displaces from the neutral position by a prescribed amount or more in the compression direction to compress the large chamber 16, and an extension-side passage restricting part that restricts the flow path area of the extension-side passage when the free piston 5 displaces from the neutral position by a prescribed amount or more in the extension direction to compress the small chamber 15.

Figure 15:
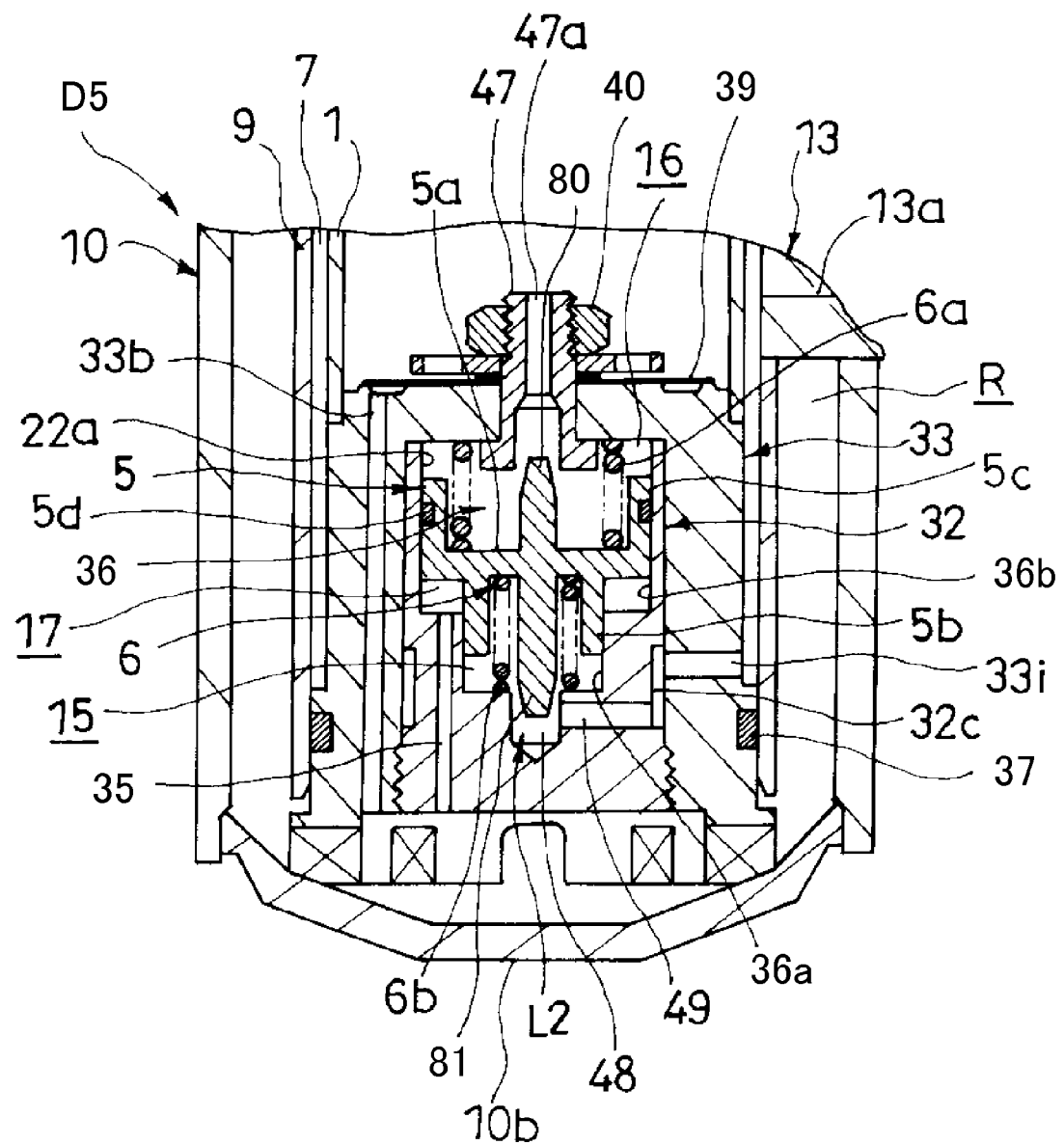
FIG. 15 illustrates an alternative example of a hydraulic cushion mechanism.

Referring to FIG. 15, a shock absorber D5 in which the compression-side passage restricting part and the extension-side passage restricting part are utilized will be explained. In the shock absorber D5, the hydraulic cushion mechanism L1 of the shock absorber D4 shown in FIG. 14 is replaced with a hydraulic cushion mechanism L2 consisting of the compression-side passage restricting part and the extension-side passage restricting part. The other constitutions of the shock absorber D5 are the same as those of the shock absorber D4, and thus detailed explanations thereof will be omitted.

The large chamber 16 communicates with the compression-side chamber R2 through a passage 47*a* formed in a bolt 47. The passage 47*a* functions as a compression-side passage. The passage 47*a* has a larger opening diameter to the large chamber 16 than the passage 38*d* of the bolt 38 of the shock absorber D4.

The small chamber 15 communicates with the extension-side chamber R1 through a vertical hole 48 that opens at the bottom surface of the pressure chamber 36, a horizontal hole 49 that communicates with the vertical hole 48, the annular groove 32*c* formed on the outer periphery of the case member 32, and the penetration hole 33*i* formed in the lid member 33. An orifice is not provided to the horizontal hole 49. In the shock absorber D4, the small chamber 15 also communicates with the extension-side chamber R1 through the second orifice passage 43. However, in the shock absorber D5, the second orifice chamber 43 is eliminated. Thus, in the shock absorber D5, the extension-side passage is constituted by the vertical hole 48, the horizontal hole 49, the annular groove 32*c*, the penetration hole 33*i*, and the discharge passage 7.

A rod-shaped compression-side plunger 80 is provided in the center at the upper end in FIG. 15 of the base 5*a* of the free piston 5, and a rod-shaped extension-side plunger 81 is provided in the center at the lower end in FIG. 15 of the base 5*a*. The annular groove 5*j* and the hole 5*k* that are provided in the free piston 5 in the shock absorber D4 are eliminated in the shock absorber D5.

When the free piston 5 displaces from the neutral position in a compression direction (upward direction in FIG. 15) to compress the large chamber 16, the compression-side plunger 80 advances into the passage 47*a*, thereby decreasing the flow path area of the passage 47*a*, which is the compression-side passage. On the other hand, when the free piston 5 displaces from the neutral position in an extension direction (downward direction in FIG. 15) to compress the small chamber 15, the extension-side plunger 81 advances into the vertical hole 48, thereby decreasing the flow path area of the vertical hole 48 and the horizontal hole 49 in the extension-side passage.

In this way, in the shock absorber D5, the compression-side passage restricting part is constituted by the compression-side plunger 80 and the extension-side passage restricting part is constituted by the extension-side plunger 81.

When the free piston 5 displaces from the neutral position by a prescribed amount or more in the compression direction, the hydraulic cushion mechanism L2 decreases the flow path area of the compression-side passage in order to increase the resistance on the passage of working oil therein. Thus, displacement of the free piston 5 in the compression direction is suppressed and the movement speed of the free piston 5 is reduced. On the other hand, when the free piston 5 displaces from the neutral position by a prescribed amount or more in the extension direction, the hydraulic cushion mechanism L2 decreases the flow path area of the extension-side passage in order to increase the resistance on the passage of working oil therein. Thus, displacement of the free piston 5 in the extension direction is suppressed and the movement speed of the free piston 5 is reduced.

The prescribed amount in the compression direction can be set at a position at which the compression-side plunger 80 begins to advance into the passage 47*a*, and thus it can be arbitrarily set by adjusting the length of the bolt 47 or the compression-side plunger 80. The prescribed amount in the extension direction can be set at a position at which the extension-side plunger 81 begins to advance into the vertical hole 48, and thus it can be arbitrarily set by adjusting the length of the extension-side plunger 81. The prescribed amount in the compression direction and the prescribed amount in the extension direction may be different.

In the shock absorber D5, the movement speed of the free piston 5 can be reduced when the free piston 5 displaces from the neutral position by a prescribed amount or more in the compression direction or the extension direction, and thus forceful collisions between the free piston 5 and the bottom member 11 can be prevented. Therefore, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D5. The hydraulic cushion mechanism L2 can be constituted by either one of the compression-side passage restricting part and the extension-side passage restricting part, and the compression-side passage restricting part and the extension-side passage restricting part can also be used together with the hydraulic cushion mechanism L1.

Figure 16:
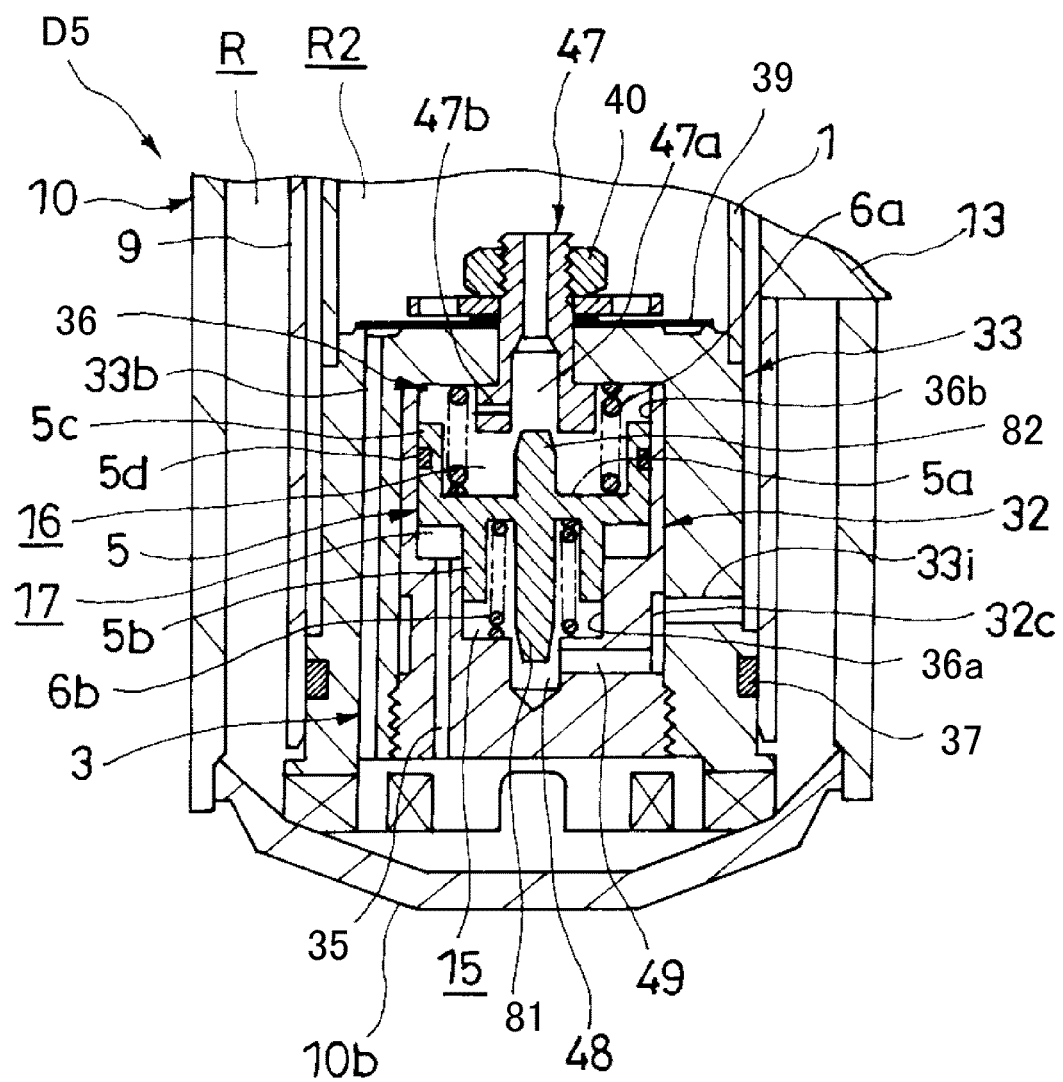
FIG. 16 illustrates an alternative example of a hydraulic cushion mechanism.

As shown in FIG. 16, if the compression-side plunger 82 is formed so as to completely block the opening end of the passage 47a, it is also possible to form an orifice hole 47b that communicates with the passage 47a from the side of the bolt 47.

Figure 17:
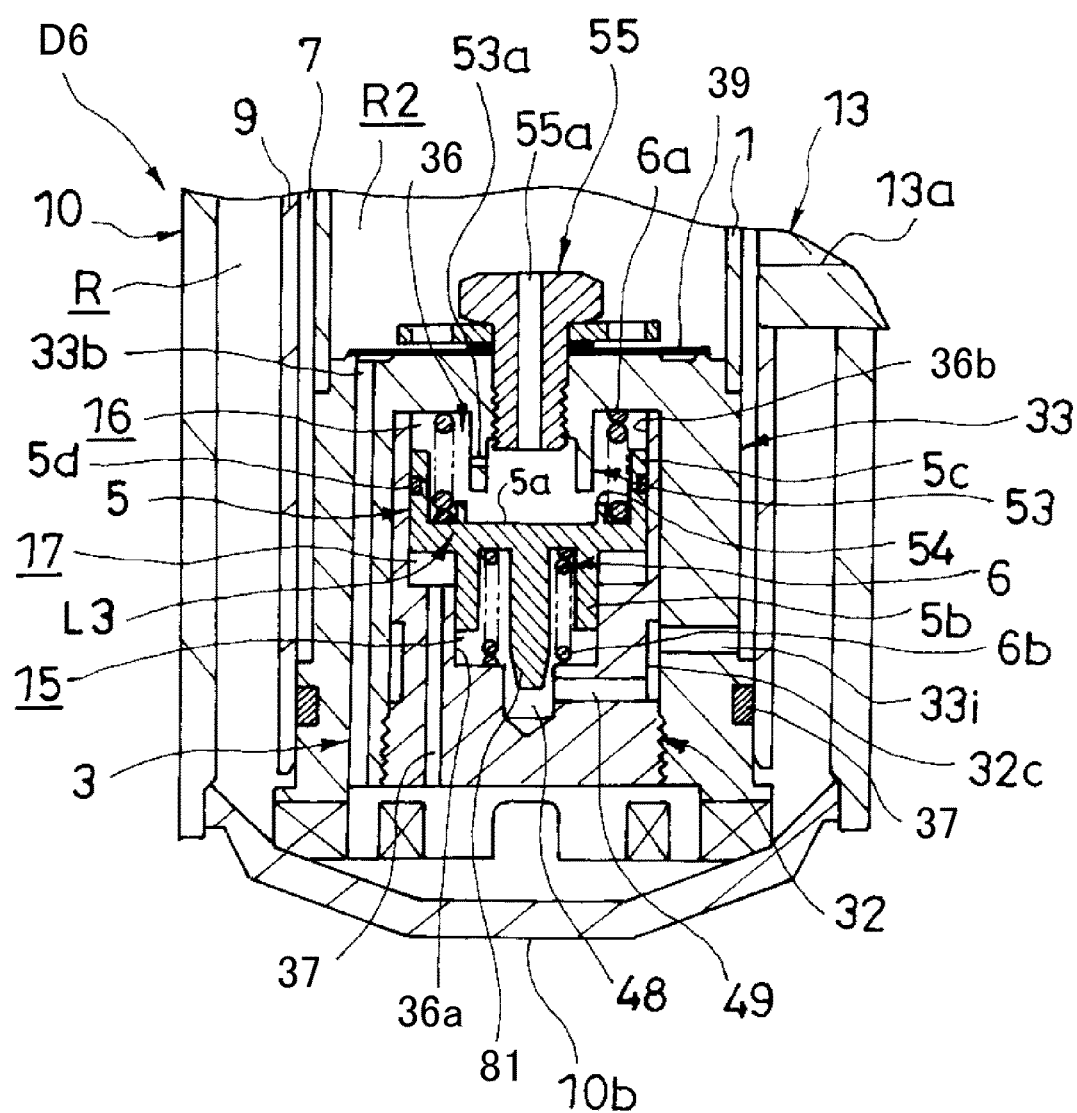
FIG. 17 illustrates an alternative example of a hydraulic cushion mechanism.

As shown in a shock absorber D6 illustrated in FIG. 17, instead of the compression-side plunger 82, the compression-side passage restricting part can be constituted by an annular wall 53 that is formed in the lid member 33 and faces the large chamber 16, and an annular projection 54 that is formed on the base 5a of the free piston 5 and permits the annular wall 53 to advance therein.

On its inner periphery, the annular wall 53 has a threaded part into which a hollow bolt 55 is screwed, and the large chamber 16 and the compression-side chamber R2 communicate through a passage 55a formed in the hollow bolt 55. Therefore, the passage 55a corresponds to a compression-side passage. Further, an orifice hole 53a that penetrates from the inner periphery to the outer periphery of the annular wall 53 is formed in the annular wall 53. The inner diameter of the annular projection 54 is formed so that the annular wall 53 can advance into the inner periphery of the annular projection 54. Further, the annular projection 54 is formed with a length such that the orifice hole 53a is not blocked even if the annular wall 53 advances into the inner periphery of the annular projection 54 and the distal end of the annular wall 53 abuts the base 5a of the free piston 5.

When the free piston 5 displaces from the neutral position in the compression direction (upward direction in FIG. 17) to compress the large chamber 16, the annular wall 53 advances into the annular projection 54, thereby decreasing the flow path area of the passage 55a.

When the free piston 5 displaces from the neutral position by a prescribed amount or more in the compression direction, the hydraulic cushion mechanism L3 shown in FIG. 17 decreases the flow path area of the compression-side passage in order to increase the resistance on the passage of working oil therein. Thus, displacement of the free piston 5 in the compression direction is suppressed and the movement speed of the free piston 5 is reduced. On the other hand, when the free piston 5 displaces from the neutral position by a prescribed amount or more in the extension direction, the hydraulic cushion mechanism L3 decreases the flow path area of the extension-side passage in order to increase the resistance on the passage of working oil therein. Thus, displacement of the free piston 5 in the extension direction is suppressed and the movement speed of the free piston 5 is reduced.

The prescribed amount in the compression direction can be set at a position at which the annular wall 53 begins to advance into the annular projection 54, and thus it can be arbitrarily set by adjusting the length of the annular wall 53 or the annular projection 54. The prescribed amount in the compression direction and the prescribed amount in the extension direction may be different.

In the shock absorber D6, the movement speed of the free piston 5 can be reduced when the free piston 5 displaces from the neutral position by a prescribed amount or more in the compression direction or the extension direction, and thus forceful collisions between the free piston 5 and the bottom member 11 can be prevented. Therefore, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D6. The compression-side passage restricting part of the shock absorber D6 can also be used together with the extension-side passage restricting part of the shock absorber D5 and the hydraulic cushion mechanisms L and L1.

Figure 18:
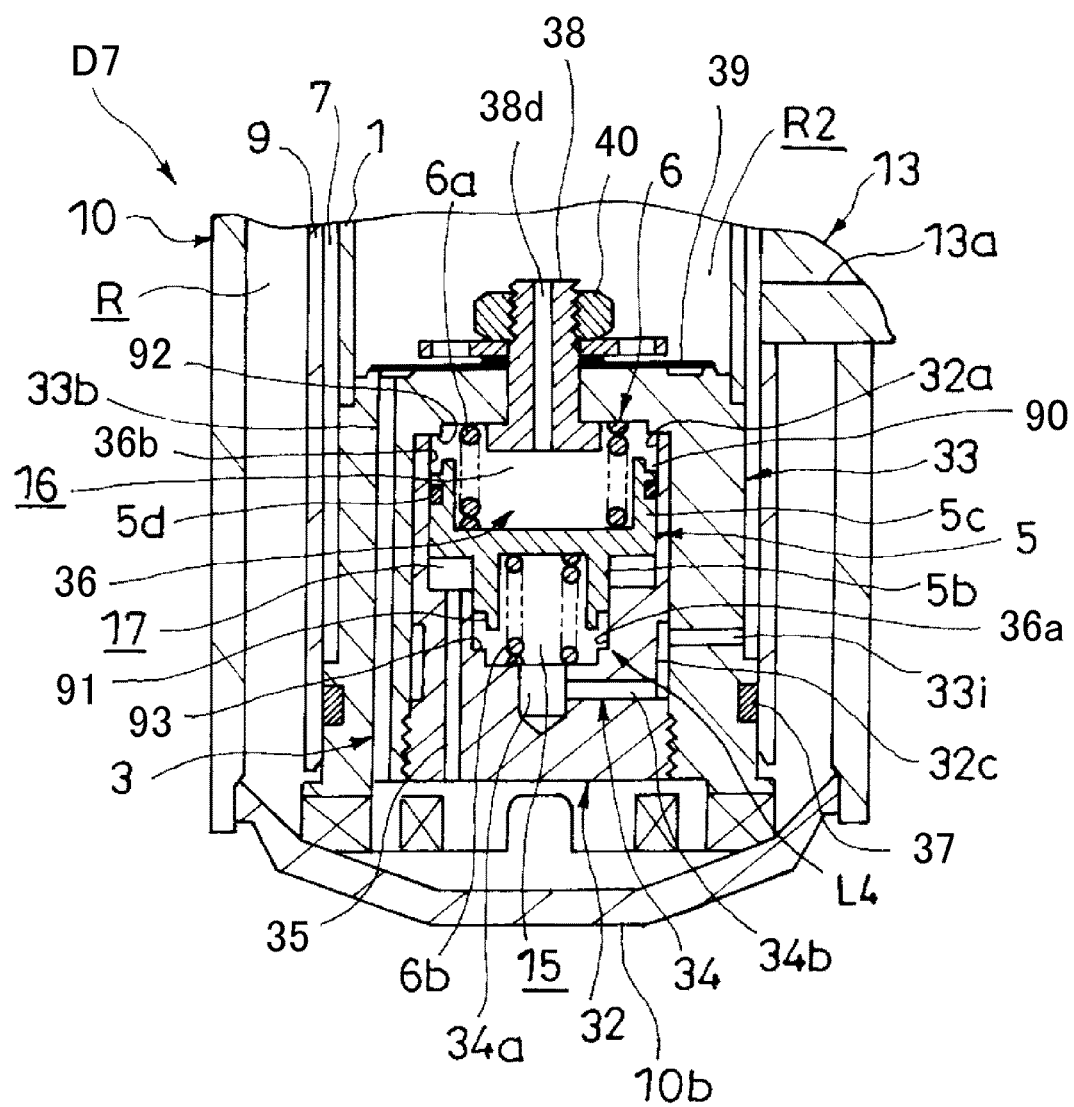
FIG. 18 illustrates an alternative example of a hydraulic cushion mechanism.

Referring to FIG. 18, a shock absorber D7 will now be explained. In the shock absorber D7, the hydraulic cushion mechanism L1 of the shock absorber D4 shown in FIG. 14 is replaced with a hydraulic cushion mechanism L4. The other constitutions of the shock absorber D7 are the same as those of the shock absorber D4 shown in FIG. 14, and thus detailed explanations thereof will be omitted.

The hydraulic cushion mechanism L4 has a compression-side cushion chamber 90 that is blocked by the free piston 5 when the free piston 5 displaces from the neutral position in the pressure chamber 36 by a prescribed amount or more in the compression direction to compress the large chamber 16 so as to suppress any further displacement of the free piston 5, and an extension-side cushion chamber 91 that is blocked by the free piston 5 when the free piston 5 displaces from the neutral position in the pressure chamber 36 by a prescribed amount or more in the extension direction to compress the small chamber 15 so as to suppress any further displacement of the free piston 5.

Specifically, the compression-side cushion chamber 90 is formed as an annular recess on the outer periphery at the upper end in FIG. 18 of the large piston part 5c of the free piston 5. The extension-side cushion chamber 91 is formed as an annular recess on the outer periphery at the lower end in FIG. 18 of the small piston part 5b of the free piston 5.

An annular protrusion 92 that protrudes toward the large chamber 16 side is formed on an end facing the large chamber 16 of the lid member 33, and an annular protrusion 93 is formed on the bottom surface of the hollow part 32a of the case member 32, or in other words on the lower end of the inner periphery of the small cross-section area part 36a.

The annular protrusion 92 is formed such that its inner diameter can advance into the annular recess forming the compression-side cushion chamber 90, and the annular protrusion 93 is formed such that its inner diameter can advance into the annular recess forming the extension-side cushion chamber 91.

When the free piston 5 displaces from the neutral position in the compression direction (upward direction in FIG. 18) to compress the large chamber 16, the annular protrusion 92 advances into the annular recess forming the compression-side cushion chamber 90, and thus the compression-side cushion chamber 90 becomes blocked. Thereby, even if the free piston 5 tries to move further in the compression direction, the pressure of the compression-side cushion chamber 90 rises so that further movement of the free piston 5 is restricted. On the other hand, when the free piston 5 displaces from the neutral position in the extension direction (downward direction in FIG. 18) to compress the small chamber 15, the annular protrusion 93 advances into the annular recess forming the extension-side cushion chamber 91, and thus the extension-side cushion chamber 91 becomes blocked. Thereby, even if the free piston 5 tries to move further in the extension direction, the pressure of the extension-side cushion chamber 91 rises so that further movement of the free piston 5 is restricted.

The prescribed amount in the compression direction can be set at a position at which the annular protrusion 92 begins to advance into the annular recess forming the compression-side cushion chamber 90, and thus it can be arbitrarily set by adjusting the length of the annular recess forming the compression-side cushion chamber 90 or the position and length of the annular protrusion 92. The prescribed amount in the extension direction can be set at a position at which the annular protrusion 93 begins to advance into the annular recess forming the extension-side cushion chamber 91, and thus it can be arbitrarily set by adjusting the length of the annular recess forming the extension-side cushion chamber 91 or the position and length of the annular protrusion 93. The prescribed amount in the compression direction and the prescribed amount in the extension direction may be different.

In the shock absorber D7, the movement speed of the free piston 5 can be reduced when the free piston 5 displaces from the neutral position by a prescribed amount or more in the compression direction or the extension direction, and thus forceful collisions between the free piston 5 and the bottom member 11 can be prevented. Therefore, slapping caused by collisions between the free piston 5 and the bottom member 11 is reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber D7. The hydraulic cushion mechanism L4 can be constituted by either one of the compression-side cushion chamber 90 and the extension-side cushion chamber 91, and the compression-side cushion chamber 90 and the extension-side cushion chamber 91 can also be used together with the hydraulic cushion mechanisms L and L1.

The hydraulic cushion mechanism L4 can also be applied to the structure of the shock absorber D3 shown in FIGS. 10 and 11. Further, the extension-side cushion chamber 91 can also be provided in the outer periphery chamber 17 by forming an annular recess on the outer periphery of the base 5a of the free piston 5 and forming an annular protrusion at the lower end of the inner periphery of the large cross-section area part 25b, 36b of the pressure chamber 25, 36.

In addition, the compression-side cushion chamber 90 and the extension-side cushion chamber 91 can be formed with structures other than those described above. The compression-side cushion chamber 90 can be formed with any kind of structure as long as it is blocked by the free piston 5 when the free piston 5 displaces by a prescribed amount or more in the compression direction, and the extension-side cushion chamber 91 can be formed with any kind of structure as long as it is blocked by the free piston 5 when the free piston 5 displaces by a prescribed amount or more in the extension direction.

According to the third and fourth embodiments described above, the following effects are achieved.

Since the hydraulic cushion mechanism prevents forceful collisions between the free piston 5 and the bottom member 11, slapping caused by collisions between the free piston 5 and the bottom member 11 can be reduced, and thus the vehicle passengers are not made to feel discomfort or anxiety. In addition, since there are no sudden stops of the free piston 5, there are no sudden losses of the damping force reducing effects leading to sudden changes in the damping force generated by the shock absorber.

Therefore, according to the shock absorbers of the third and fourth embodiments, the occurrence of slapping between the free piston 5 and the bottom member 11 can be suppressed and sudden changes in the damping force can be prevented, and thereby the riding comfort in the vehicle can be improved.

Embodiments of this invention were described above, but the above embodiments are merely examples of applications of this invention, and the technical scope of this invention is not limited to the specific constitutions of the above embodiments.

This application claims priorities based on Japanese Patent Application No. 2013-60600, No. 2013-60601, and No. 2013-60602 filed with the Japan Patent Office on Mar. 22, 2013, the entire contents of which are incorporated into this specification.

The invention claimed is:

1. A shock absorber comprising:
a cylinder which is filled with a fluid;
a piston that is slidably inserted into the cylinder and partitions the inside of the cylinder into an extension-side chamber and a compression-side chamber;
a piston rod that is connected at one end to the piston and projects at the other end toward the outside of the cylinder;
a reservoir configured to compensate for a change in capacity in the cylinder accompanying an ingression and retraction of the piston rod into and out of the cylinder;
a suction passage configured to permit only a flow of the fluid from the reservoir toward the compression-side chamber;
a rectification passage configured to permit only a flow of the fluid from the compression-side chamber toward the extension-side chamber;
a damping force adjusting part configured to permit only a flow of the fluid from the extension-side chamber toward the reservoir and be capable of changing a resistance applied to the flow of the fluid;
a housing that has a pressure chamber therein;
a free piston that is slidably inserted into the pressure chamber and forms an extension-side pressure chamber and a compression-side pressure chamber within the pressure chamber; and
a spring element configured to position the free piston in a neutral position within the pressure chamber and exert a biasing force to suppress displacement of the free piston from the neutral position,
wherein the extension-side chamber communicates with the extension-side pressure chamber so as to press the free piston in one sliding direction, and the compression-side chamber communicates with the compression-side pressure chamber so as to press the free piston in the other sliding direction, and
a pressure-receiving area of the free piston upon which a pressure of the compression-side pressure chamber acts is larger than a pressure-receiving area of the free piston upon which a pressure of the extension-side pressure chamber acts.

2. The shock absorber according to claim 1, wherein the free piston comprises a small piston part that is slidably inserted into a small cross-section area part of the pressure chamber, and a large piston part that is slidably inserted into a large cross-section area part of the pressure chamber,
wherein a small chamber is partitioned by the small piston part within the small cross-section area part, an outer periphery chamber is partitioned on an outer periphery of the small piston part within the large cross-section area part, and a large chamber is partitioned by the large piston part within the large cross-section area part, and wherein one of the small chamber and the outer periphery chamber is the extension-side pressure chamber, and the large chamber is the compression-side pressure chamber.

3. The shock absorber according to claim 2, wherein the other of the small chamber and the outer periphery chamber communicates with the reservoir.

4. The shock absorber according to claim 1, further comprising:
an outer tube provided on the outside of the cylinder;
an intermediate tube provided between the cylinder and the outer tube; and
a discharge passage that is formed between the cylinder and the intermediate tube and causes the extension-side chamber and the reservoir to communicate with each other,
wherein the housing is fitted to an end of the cylinder and the intermediate tube,
the reservoir is formed between the intermediate tube and the outer tube,
the damping force adjusting part is provided between the discharge passage and the reservoir, and
the extension-side chamber communicates with the extension-side pressure chamber through the discharge passage.

5. The shock absorber according to claim 4, wherein the housing comprises:
a case member having a hollow part in which the free piston is inserted such that the free piston is capable of moving in an up-down direction; and
a lid member that blocks the hollow part of the case member to form the pressure chamber.

6. The shock absorber according to claim 1, further comprising a cushion member configured to prevent the free piston from colliding with the housing.

7. The shock absorber according to claim 6, wherein the free piston comprises a small piston part that is slidably inserted into a small cross-section area part of the pressure chamber, and a large piston part that is slidably inserted into a large cross-section area part of the pressure chamber,
wherein a small chamber is partitioned by the small piston part within the small cross-section area part, an outer periphery chamber is partitioned on an outer periphery of the small piston part within the large cross-section area part, and a large chamber is partitioned by the large piston part within the large cross-section area part,
wherein one of the small chamber and the outer periphery chamber is the extension-side pressure chamber, and the large chamber is the compression-side pressure chamber, and
wherein the cushion member comprises:
an extension-side cushion configured to prevent the free piston from colliding with the housing when the free piston moves in a direction to compress the small chamber; and
a compression-side cushion configured to prevent the free piston from colliding with the housing when the free piston moves in a direction to compress the large chamber.

8. The shock absorber according to claim 7, wherein the spring element comprises:
an extension-side spring that is accommodated within the small chamber and interposed between the free piston and the housing; and
a compression-side spring that is accommodated within the large chamber and interposed between the free piston and the housing, wherein the extension-side cushion is fixed to one of the free piston and the housing by the extension-side spring, and the compression-side cushion is fixed to one of the free piston and the housing by the compression-side spring.

9. The shock absorber according to claim 7, further comprising a rubber member that penetrates through the free piston,
wherein an end on the small chamber side of the rubber member is the extension-side cushion, and an end on the large chamber side of the rubber member is the compression-side cushion.

10. The shock absorber according to claim 7, wherein the extension-side cushion is an annular first elastic body that is fixed to the housing and opposes a surface on the small chamber side of the free piston, and the compression-side cushion is an annular second elastic body that is fixed to the housing and opposes a surface on the large chamber side of the free piston.

11. The shock absorber according to claim 10, wherein the first elastic body and the second elastic body are wave washers or rubber rings.

12. The shock absorber according to claim 1, further comprising a hydraulic cushion mechanism configured to suppress collisions between the free piston and the housing.

13. The shock absorber according to claim 12, wherein the free piston comprises a small piston part that is slidably inserted into a small cross-section area part of the pressure chamber, and a large piston part that is slidably inserted into a large cross-section area part of the pressure chamber,
wherein a small chamber is partitioned by the small piston part within the small cross-section area part, an outer periphery chamber is partitioned on an outer periphery of the small piston part within the large cross-section area part, and a large chamber is partitioned by the large piston part within the large cross-section area part,
wherein one of the small chamber and the outer periphery chamber is the extension-side pressure chamber, and the large chamber is the compression-side pressure chamber,
wherein the shock absorber further comprises:
an extension-side passage that causes the extension-side pressure chamber and the extension-side chamber to communicate with each other; and
a compression-side passage that causes the compression-side pressure chamber and the compression-side chamber to communicate with each other, and
wherein the hydraulic cushion mechanism is a variable throttle valve configured to decrease a flow path area of one or both of the extension-side passage and the compression-side passage by displacement of the free piston.

14. The shock absorber according to claim 12, wherein the free piston comprises a small piston part that is slidably inserted into a small cross-section area part of the pressure chamber, and a large piston part that is slidably inserted into a large cross-section area part of the pressure chamber,
wherein a small chamber is partitioned by the small piston part within the small cross-section area part, an outer periphery chamber is partitioned on an outer periphery of the small piston part within the large cross-section area part, and a large chamber is partitioned by the large piston part within the large cross-section area part,
wherein one of the small chamber and the outer periphery chamber is the extension-side pressure chamber, and the large chamber is the compression-side pressure chamber, wherein the shock absorber further comprises:
an extension-side passage that causes the extension-side pressure chamber and the extension-side chamber to communicate with each other; and
a compression-side passage that causes the compression-side pressure chamber and the compression-side chamber to communicate with each other, and
wherein the hydraulic cushion mechanism comprises:
a compression-side passage restricting part configured to reduce a flow path area of the compression-side passage when the free piston displaces from the neutral position by a prescribed amount or more in a compression direction to compress the large chamber; and
an extension-side passage restricting part configured to reduce a flow path area of the extension-side passage when the free piston displaces from the neutral position by a prescribed amount or more in an extension direction to compress the small chamber.

15. The shock absorber according to claim 14, wherein the extension-side passage restricting part comprises an extension-side plunger that is provided on the free piston and is capable of advancing into the extension-side passage, and
when the free piston displaces from the neutral position by a prescribed amount or more in the extension direction, the extension-side plunger advances into the extension-side passage to reduce the flow path area of the extension-side passage.

16. The shock absorber according to claim 14, wherein the compression-side passage restricting part comprises a compression-side plunger that is provided on the free piston and is capable of advancing into the compression-side passage, and
when the free piston displaces from the neutral position by a prescribed amount or more in the compression direction, the compression-side plunger advances into the compression-side passage to reduce the flow path area of the compression-side passage.

17. The shock absorber according to claim 14, wherein the housing comprises an annular wall that faces the large chamber,
the compression-side passage communicates with the compression-side chamber through the inside of the annular wall,
the compression-side passage restricting part comprises an annular projection formed on the large chamber side of the free piston, the annular projection being configured to permit the annular wall to advance therein, and
when the free piston displaces from the neutral position by a prescribed amount or more in a compression direction to compress the large chamber, the annular wall advances into the annular projection to reduce the flow path area of the compression-side passage.

18. The shock absorber according to claim 12, wherein the hydraulic cushion mechanism comprises a compression-side cushion chamber and an extension-side cushion chamber,
wherein when the free piston displaces from the neutral position by a prescribed amount or more in a compression direction to compress the large chamber, the compression-side cushion chamber is blocked by the free piston to suppress further displacement of the free piston, and
when the free piston displaces from the neutral position by a prescribed amount or more in an extension direction to compress the small chamber, the extension-side cushion chamber is blocked by the free piston to suppress further displacement of the free piston.

* * * * *